(12) United States Patent (10) Patent No.: US 12,622,436 B2
Khanania (45) Date of Patent: May 12, 2026

(54) COOKING SYSTEM AND HEAT EXCHANGER WITH COMBUSTION CHAMBER

(71) Applicant: Souhel Khanania, Irving, TX (US)

(72) Inventor: Souhel Khanania, Irving, TX (US)

( * ) Notice: Subject to any disclaimer, the term of this patent is extended or adjusted under 35 U.S.C. 154(b) by 371 days.

(21) Appl. No.: 18/446,250

(22) Filed: Aug. 8, 2023

(65) Prior Publication Data

US 2025/0049042 A1 Feb. 13, 2025

(51) Int. Cl.
| *A21B 1/10* | (2006.01) |
| *F28D 1/053* | (2006.01) |
| *F28F 3/06* | (2006.01) |
| *F28F 9/22* | (2006.01) |
| *F28D 21/00* | (2006.01) |

(52) U.S. Cl.
CPC ................ *A21B 1/10* (2013.01); *F28D 1/053* (2013.01); *F28F 3/06* (2013.01); *F28F 9/22* (2013.01); *F28D 2021/0056* (2013.01)

(58) Field of Classification Search
CPC ... A21B 1/10; F28D 1/053; F28D 2021/0056; F28F 3/06; F28F 9/22
USPC ...................................................... 126/19 R
See application file for complete search history.

(56) References Cited

U.S. PATENT DOCUMENTS

| 1,127,899 A | 2/1915 | Koppitz et al. |
| 1,630,309 A | 5/1927 | Pitman |
| 1,991,631 A | 2/1935 | Sangster |

| 2,212,905 A | 8/1940 | Tota |
| 2,243,661 A | 5/1941 | Tota |
| 2,290,784 A | 7/1942 | Turpin |
| 2,429,360 A | 10/1947 | Kells |
| 2,533,143 A | 12/1950 | Scharbau et al. |
| 2,666,427 A | 1/1954 | Keating |
| 2,788,848 A | 4/1957 | Furczyk |
| 2,824,604 A | 2/1958 | Reed |
| 3,002,553 A | 10/1961 | Reed |
| 3,065,741 A | 11/1962 | Gerard |

(Continued)

FOREIGN PATENT DOCUMENTS

| CH | 106654 A | 10/1924 |
| CN | 205402820 U | 7/2016 |

(Continued)

OTHER PUBLICATIONS

Advisory Action dated Jan. 30, 2024; U.S. Appl. No. 17/825,717, filed May 26, 2022; 3 pages.

(Continued)

*Primary Examiner* — Avinash A Savani
(74) *Attorney, Agent, or Firm* — Conley Rose, P.C.; J. Robert Brown, Jr.

(57) ABSTRACT

A heat exchanger for a cooking system is provided. The heat exchanger includes a central axis and a combustion chamber. The combustion chamber includes a central flow path, an inlet manifold, and an outlet manifold axially spaced from the inlet manifold. The inlet manifold and the outlet manifold extend annularly about the central flow path. A plurality of outer walls extend axially between the inlet manifold and the outlet manifold, wherein the plurality of outer walls are arranged about a radially outer perimeter of the central flow path. A burner assembly includes one or more burners that are configured to emit a combusted air/fuel mixture into the central flow path.

16 Claims, 23 Drawing Sheets

(56) References Cited

U.S. PATENT DOCUMENTS

| | | | |
|---|---|---|---|
| 3,333,123 A | 7/1967 | Baumann | |
| 3,351,041 A | 11/1967 | Watson et al. | |
| 3,483,920 A | 12/1969 | Heyn et al. | |
| 3,667,374 A | 6/1972 | Homes | |
| 3,757,746 A | 9/1973 | Sharan | |
| 3,773,019 A | 11/1973 | Hapgood | |
| 3,782,118 A | 1/1974 | Butter et al. | |
| 3,831,560 A | 8/1974 | Kuhnlein | |
| 3,839,951 A | 10/1974 | Palmason | |
| 3,843,313 A | 10/1974 | Helgeson | |
| 3,850,571 A | 11/1974 | Zink et al. | |
| 3,990,433 A | 11/1976 | Keating | |
| 4,020,189 A | 4/1977 | Wright et al. | |
| 4,202,182 A | 5/1980 | Kawashima et al. | |
| 4,253,821 A | 3/1981 | Bradshaw | |
| 4,373,504 A | 2/1983 | Day | |
| 4,466,482 A | 8/1984 | Dorazio et al. | |
| 4,475,587 A | 10/1984 | Vasiliev et al. | |
| 4,615,895 A | 10/1986 | Bhattacharjee | |
| 4,662,350 A * | 5/1987 | Mossbach | F24H 6/00 |
| | | | 122/18.31 |
| 4,702,693 A | 10/1987 | Frailoi | |
| 4,786,247 A | 11/1988 | Bhattacharjee | |
| 4,825,846 A | 5/1989 | Frailoi | |
| 4,848,318 A * | 7/1989 | Brewer | F23D 14/34 |
| | | | 126/92 AC |
| 4,858,592 A | 8/1989 | Hayek et al. | |
| 4,889,103 A | 12/1989 | Frailoi | |
| 4,980,187 A | 12/1990 | Johnson | |
| 5,137,740 A | 8/1992 | Benson et al. | |
| 5,209,218 A | 5/1993 | Daneshvar et al. | |
| 5,230,796 A | 7/1993 | Ter Meulen | |
| 5,251,693 A | 10/1993 | Zifferer | |
| 5,287,919 A | 2/1994 | George, II et al. | |
| 5,318,438 A | 6/1994 | Sugahara et al. | |
| 5,540,215 A | 7/1996 | Fritzsche et al. | |
| 5,690,166 A | 11/1997 | Yamaguchi | |
| 5,779,465 A | 7/1998 | Clarke et al. | |
| 5,901,641 A | 5/1999 | McNamara | |
| 6,029,653 A * | 2/2000 | Tiszai | F23C 3/004 |
| | | | 99/403 |
| 6,085,701 A * | 7/2000 | Stauffer | F24H 9/02 |
| | | | 110/238 |
| 6,103,118 A | 8/2000 | Ter Meulen | |
| 6,315,552 B1 | 11/2001 | Haynes | |
| 6,561,183 B1 * | 5/2003 | Spilde | F24H 9/06 |
| | | | 122/18.2 |
| 6,837,234 B2 | 1/2005 | Rabas et al. | |
| 7,040,385 B2 | 5/2006 | Higashiyama | |
| 7,303,777 B2 | 12/2007 | Baas et al. | |
| 9,074,765 B2 | 7/2015 | Armanni | |
| 11,346,548 B2 | 5/2022 | Khanania | |
| 11,346,549 B2 | 5/2022 | Khanania | |
| 11,690,471 B2 | 7/2023 | Khanania | |
| 2003/0034027 A1 | 2/2003 | Yamamoto et al. | |
| 2004/0250810 A1 | 12/2004 | Schultz et al. | |
| 2005/0056270 A1 | 3/2005 | Babington | |
| 2005/0181102 A1 | 8/2005 | Basker et al. | |
| 2005/0194120 A1 | 9/2005 | Lomax, Jr. et al. | |
| 2006/0177788 A1 | 8/2006 | Kang et al. | |
| 2007/0042306 A1 | 2/2007 | Bacon | |
| 2007/0089732 A1 | 4/2007 | Ricord et al. | |
| 2007/0137497 A1 | 6/2007 | Savage et al. | |
| 2007/0254254 A1 | 11/2007 | Gehring et al. | |
| 2008/0022994 A1 | 1/2008 | Hutchinson et al. | |
| 2009/0061369 A1 | 3/2009 | Wang et al. | |
| 2009/0283462 A1 | 11/2009 | Schroeder | |
| 2010/0012304 A1 | 1/2010 | Lee et al. | |
| 2010/0081098 A1 | 4/2010 | D'Agostini et al. | |
| 2010/0139885 A1 | 6/2010 | Hoffman et al. | |
| 2010/0282095 A1 | 11/2010 | Highnote | |
| 2011/0287154 A1 | 11/2011 | Resser et al. | |
| 2012/0121771 A1 | 5/2012 | Jones | |
| 2013/0025546 A1 | 1/2013 | Okamoto et al. | |

| | | | |
|---|---|---|---|
| 2013/0118719 A1 * | 5/2013 | Jordan | F24H 8/00 |
| | | | 165/121 |
| 2013/0213385 A1 | 8/2013 | O'Donnell et al. | |
| 2013/0260323 A1 | 10/2013 | Hong et al. | |
| 2013/0312700 A1 | 11/2013 | Oda | |
| 2014/0080072 A1 | 3/2014 | Smirnov et al. | |
| 2014/0165991 A1 | 6/2014 | Noman et al. | |
| 2015/0128926 A1 | 5/2015 | Noman et al. | |
| 2015/0305541 A1 | 10/2015 | Wassmus et al. | |
| 2016/0146541 A1 * | 5/2016 | De Nardis | F28D 7/024 |
| | | | 165/110 |
| 2017/0131034 A1 | 5/2017 | Ribarov et al. | |
| 2017/0184304 A1 | 6/2017 | Khanania | |
| 2017/0265683 A1 | 9/2017 | Gogel et al. | |
| 2018/0142896 A1 * | 5/2018 | Jacobs | F24C 13/00 |
| 2019/0142220 A1 | 5/2019 | Shirali et al. | |
| 2019/0382683 A1 | 12/2019 | Devine et al. | |
| 2020/0309408 A1 | 10/2020 | Kawada | |
| 2021/0321823 A1 | 10/2021 | Kalling | |
| 2022/0282863 A1 | 9/2022 | Khanania | |
| 2022/0330754 A1 | 10/2022 | Broadbent et al. | |
| 2023/0270274 A1 | 8/2023 | Khanania | |
| 2025/0107663 A1 | 4/2025 | Tubic et al. | |

FOREIGN PATENT DOCUMENTS

| | | |
|---|---|---|
| CN | 205448295 U | 8/2016 |
| CN | 205537227 U | 8/2016 |
| DE | 102008055981 A1 | 5/2010 |
| EP | 0859199 B1 | 10/2004 |
| EP | 2160966 A1 | 3/2010 |
| GB | 599536 A | 3/1948 |
| GB | 934339 A | 8/1963 |
| GB | 1311752 A | 3/1973 |
| GB | 2032611 A | 5/1980 |
| JP | 5792643 A | 6/1982 |
| JP | 2000253838 A | 9/2000 |
| JP | 2004308945 A | 11/2004 |
| JP | 2005061688 A | 3/2005 |
| JP | 2006132826 A | 5/2006 |
| JP | 2021083558 A | 6/2021 |
| KR | 101768528 B1 | 8/2017 |
| KR | 101775873 B1 | 9/2017 |
| WO | 9617672 A1 | 6/1996 |
| WO | 2015085098 A1 | 6/2015 |
| WO | 2020006094 A1 | 1/2020 |

OTHER PUBLICATIONS

Office Action dated Apr. 2, 2024; U.S. Appl. No. 17/825,717, filed May 26, 2022; 13 pages.

Office Action dated Aug. 14, 2025; U.S. Appl. No. 17/840,226, filed Jun. 14, 2022; 84 pages.

Advisory Action dated Oct. 17, 2025; U.S. Appl. No. 18/195,169, filed May 9, 2023; 9 pages.

European Extended Search Report; Application No. 23824402.4; Aug. 20, 2025; 8 pages.

European Examination Report; Application No. 19825728.9; Dec. 8, 2023; 4 pages.

Mexican Office Action; Application No. MX/a/2021/000181; Apr. 16, 2024; 5 pages.

Mexican Office Action; Application No. MX/a/2021/000181; Jul. 9, 2024; 6 pages.

Office Action dated Jan. 23, 2025; U.S. Appl. No. 18/195,169 filed May 9, 2023; 66 pages.

Brazilian Office Action; Application No. 112020026760-0; Feb. 4, 2025; 5 pages.

Notice of Allowance dated Oct. 10, 2024; U.S. Appl. No. 17/825,717, filed May 26, 2022; 9 pages.

Office Action dated May 5, 2025; U.S. Appl. No. 17/840,226, filed Jun. 14, 2022; 8 pages.

Office Action dated Jun. 26, 2025; U.S. Appl. No. 17/840,229, filed Jun. 14, 2022; 89 pages.

Final Office Action dated Jul. 30, 2025; U.S. Appl. No. 18/195,169, filed May 9, 2023; 33 pages.

(56)                References Cited

OTHER PUBLICATIONS

PCT International Search Report & Written Opinion of the International Searching Authority; Application No. PCT/US2023/023516; Sep. 18, 2023; 10 pages.
PCT International Search Report & Written Opinion of the International Searching Authority; Application No. PCT/US2023/023514; Sep. 12, 2023; 11 pages.
Final Office Action dated Nov. 6, 2023; U.S. Appl. No. 17/825,717, filed May 26, 2022; 17 pages.
Khanania, Souhel; U.S. Appl. No. 17/840,226, filed Jun. 14, 2022; Title: Cooking System and Heat Exchanger; 85 pages.
Khanania, Souhel; U.S. Appl. No. 17/840,229, filed Jun. 14, 2022; Title: Cooking System and Vessel; 83 pages.
Office Action dated May 28, 2019; U.S. Appl. No. 15/388,796, filed Dec. 22, 2016; 32 pages.
Office Action dated Jan. 8, 2020; U.S. Appl. No. 15/388,796, filed Dec. 22, 2016; 16 pages.
Final Office Action dated Sep. 4, 2020; U.S. Appl. No. 15/388,796, filed Dec. 22, 2016; 21 pages.
Advisory Action dated Feb. 2, 2021; U.S. Appl. No. 15/388,796, filed Dec. 22, 2016; 8 pages.
Office Action dated Jun. 17, 2021; U.S. Appl. No. 15/388,796, filed Dec. 22, 2016; 21 pages.
Notice of Allowance dated Feb. 4, 2022; U.S. Appl. No. 15/388,796, filed Dec. 22, 2016; 21 pages.
Office Action dated Dec. 28, 2018; U.S. Appl. No. 15/388,941, filed Dec. 22, 2016; 29 pages.
Final Office Action dated Apr. 30, 2019; U.S. Appl. No. 15/388,941, filed Dec. 22, 2016; 20 pages.
Advisory Action dated Jul. 29, 2019; U.S. Appl. No. 15/388,941, filed Dec. 22, 2016; 3 pages.
Office Action dated Sep. 4, 2019; U.S. Appl. No. 15/388,941, filed Dec. 22, 2016; 18 pages.
Office Action dated Jan. 9, 2020; U.S. Appl. No. 16/022,390, filed Jun. 28, 2018; 37 pages.
Final Office Action dated Sep. 4, 2020; U.S. Appl. No. 16/022,390, filed Jun. 28, 2018; 19 pages.
Office Action dated Jul. 29, 2021; U.S. Appl. No. 16/022,390, filed Jun. 28, 2018; 27 pages.
Final Office Action dated Nov. 5, 2021; U.S. Appl. No. 16/022,390, filed Jun. 28, 2018; 13 pages.
Notice of Allowance dated Jan. 26, 2022; U.S. Appl. No. 16/022,390, filed Jun. 28, 2018; 5 pages.
Office Action dated Jul. 9, 2021; U.S. Appl. No. 16/732,967, filed Jan. 2, 2020; 29 pages.
Final Office Action dated Feb. 15, 2022; U.S. Appl. No. 16/732,967, filed Jan. 2, 2020; 46 pages.
PCT International Search Report; Application No. PCT/US2016/068358; Apr. 14, 2017; 3 pages.
PCT Written Opinion of the International Searching Authority; Application No. PCT/US2016/068358; Apr. 14, 2017; 11 pages.

Australian Office Action; Application No. 2016380160; Sep. 20, 2021; 4 pages.
Australian Office Action; Application No. 2016380160; Mar. 4, 2022; 2 pages.
Australian Office Action; Application No. 2016380160; Mar. 31, 2022; 2 pages.
Brazilian Office Action; Application No. 1120180133108; Published in IP Gazette May 19, 2020; 6 pages.
European Extended Search Report; Application No. 16882436.5; Aug. 6, 2019; 7 pages.
European Examination Report; Application No. 16882436.5; Feb. 26, 2021; 4 pages.
European Examination Report; Application No. 16882436.5; Feb. 11, 2022; 4 pages.
Mexican Office Action; Application No. MX/a/2018/007951; May 19, 2022; 4 pages.
PCT International Search Report; Application No. PCT/US2016/068383; Mar. 30, 2017; 3 pages.
PCT Written Opinion of the International Searching Authority; Application No. PCT/US2016/068383; Mar. 30, 2017; 8 pages.
European Extended Search Report; Application No. 16882441.5; Aug. 19, 2019; 12 pages.
PCT International Search Report & Written Opinion of the International Searching Authority; Application No. PCT/US2019/039271; Oct. 18, 2019; 11 pages.
Australian Office Action; Application No. 2019295701; Nov. 17, 2021; 5 pages.
European Extended Search Report; Application No. 19825728.9; Feb. 11, 2022; 7 pages.
Office Action dated Jul. 19, 2022; U.S. Appl. No. 16/732,967, filed Jan. 2, 2020; 34 pages.
Notice of Allowance dated Feb. 22, 2023; U.S. Appl. No. 16/732,967, filed Jan. 2, 2020; 24 pages.
Office Action dated Mar. 16, 2023; U.S. Appl. No. 17/825,717, filed May 26, 2022; 5 pages.
Mexican Office Action; Application No. MX/a/2018/007951; Aug. 10, 2022; 5 pages.
Australian Office Action; Application No. 2019295701; Aug. 3, 2022; 4 pages.
Office Action dated Jun. 30, 2023; U.S. Appl. No. 17/825,717, filed May 26, 2022; 39 pages.
Brazilian Office Action; Application No. 112020026760-0; Jun. 8, 2023; 6 pages.
Final Office Action dated Dec. 4, 2025; U.S. Appl. No. 17/840,229, filed Jun. 14, 2022; 34 pages.
Advisory Action dated Feb. 6, 2026; U.S. Appl. No. 17/840,229, filed Jun. 14, 2022; 3 pages.
Office Action dated Nov. 28, 2025; U.S. Appl. No. 18/195,169, filed May 9, 2023; 15 pages.
Final Office Action dated Mar. 23, 2026; U.S. Appl. No. 17/840,226, filed Jun. 14, 2022; 26 pages.
Notice of Allowance dated Apr. 13, 2026; U.S. Appl. No. 18/195,169 filed May 9, 2023; 13 pages.

* cited by examiner

COOKING SYSTEM AND HEAT EXCHANGER WITH COMBUSTION CHAMBER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Industrial food cooking systems include heat generation equipment and/or heat transfer equipment to produce and/or transfer heat to a cooking medium contained in a cooking vessel for cooking consumables prior to packaging. Such heat generation equipment and/or heat transfer equipment often includes a burner or burners configured to combust an air/fuel mixture to produce heat and one or more heat exchangers to transfer the heat produced by the burner to the cooking medium.

SUMMARY

In one embodiment, a heat exchanger for a cooking system is provided. The heat exchanger includes a central axis and a combustion chamber. The combustion chamber includes a central flow path, an inlet manifold, and an outlet manifold axially spaced from the inlet manifold. The inlet manifold and the outlet manifold extend annularly about the central flow path. A plurality of outer walls extend axially between the inlet manifold and the outlet manifold, wherein the plurality of outer walls are arranged about a radially outer perimeter of the central flow path. A burner assembly includes one or more burners that are configured to emit a combusted air/fuel mixture into the central flow path.

In one embodiment, a heat exchanger is provided that includes a central axis and a combustion chamber. The combustion chamber includes a central flow path, an inlet manifold, and an outlet manifold axially spaced from the inlet manifold. The combustion chamber also includes a plurality of walls extending axially between the inlet manifold and the outlet manifold, wherein the plurality of walls are arranged about a radially outer perimeter of the central flow path, wherein each outer wall includes an inner wall spaced apart from an outer wall and an inner passageway defining a space between the inner and outer walls. The combustion chamber also includes a burner assembly including one or more burners that are configured to emit a combusted air/fuel mixture into the central flow path.

In another embodiment, a cooking system is provide that includes a cooking vessel configured to receive a cooking fluid and a food item to perform a cooking reaction, and a heat exchanger coupled to the cooking vessel that is configured to provide the cooking fluid to the cooking vessel. The heat exchanger includes a combustion chamber. The combustion chamber includes a central axis, an inlet manifold, an outlet manifold axially spaced from the inlet manifold, a plurality of walls extending axially between the inlet manifold and the outlet manifold, and a burner assembly. The cooking system also includes a heat exchanger assembly coupled to the combustion chamber. The heat exchanger assembly includes a plurality of first headers positioned about a radially outer perimeter of the heat exchanger assembly, and a plurality of first tubes extending between the plurality of headers. The heat exchanger is configured to flow cooking fluid through the inlet manifold, the plurality of walls of the combustion chamber, the outlet manifold, the plurality of first headers, and the plurality of first tubes of the heat exchanger assembly. The heat exchanger also includes a fluid duct extending axially through the combustion chamber and the heat exchanger assembly, wherein the plurality of walls of the combustion chamber are arranged about an outer perimeter of the fluid duct, wherein the burner assembly is configured to emit combusted air/fuel mixture into the fluid duct, and wherein the plurality of first tubes of the heat exchanger assembly extend radially across the fluid duct.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

As previously described, industrial food cooking systems include heat generation equipment and/or heat transfer equipment to produce and/or transfer heat to a cooking medium contained in a cooking vessel for cooking consumables prior to packaging. As with any manufacturing facility, loss of production due to maintenance and/or repair of industrial food cooking systems can lead to economic loss. Further, it is both economically and environmentally beneficial to obtain efficient transfer of heat to cooking medium and avoid excessive heat loss.

Figure 1:
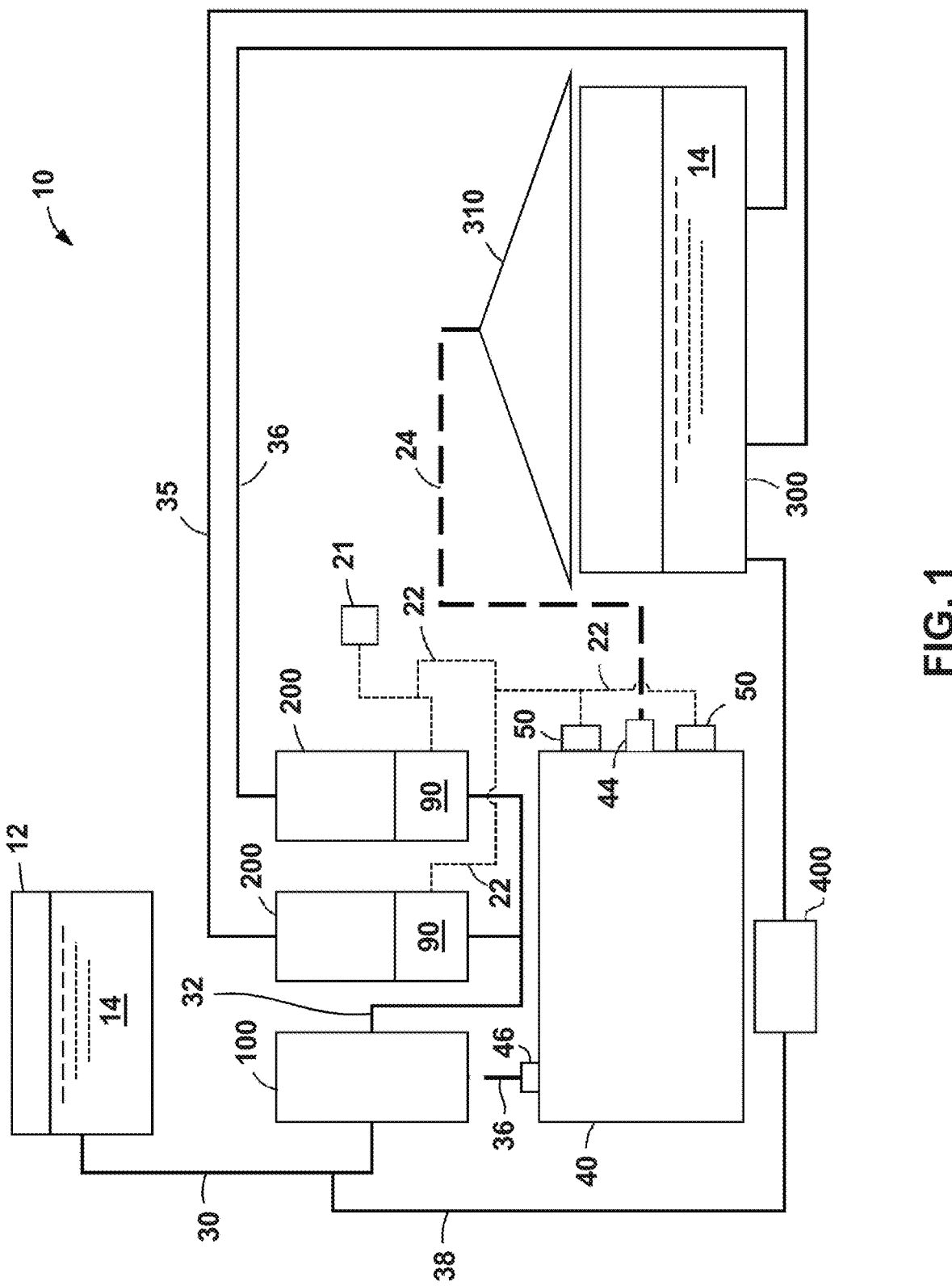
FIG. 1 is a schematic diagram of a cooking system according to some embodiments.

Referring now to FIG. 1, a schematic view of a cooking system 10 according to some embodiments is shown. Cooking system 10 generally includes a reservoir 12, a first heat exchanger 100, a plurality of second heat exchangers 200, a cooking vessel 300, a thermal oxidizer 40, and a filter assembly 400. In addition, cooking system 10 includes a cooking fluid circuit comprising conduits 30, 32, 35, 38, an exhaust system comprising conduits 24, 36, and a fuel system comprising conduits 22 and header 21. Each of the conduits 30, 32, 35, 38, 24, 36, 22 may comprise any suitable fluid conveyance member capable of channeling fluids there through. For example, conduits 30, 32, 35, 38, 24, 36, 22 may comprise pipes, hoses, open channels, or other fluid conveyances.

Cooking vessel 300 may comprise any suitable vessel or tub for containing a cooking fluid 14 (e.g., oil, water, etc.) at a high temperature. Further details of embodiments of cooking vessel 300 are provided below. Reservoir 12 may comprise a tank or vessel (or collection of vessels) that is configured to hold or store the cooking fluid 14 for use within cooking system 10.

Heat exchangers 100, 200 may comprise any suitable device for transferring heat between two fluids. Further details of embodiments of heat exchangers 100, 200 are provided below. During operations, heat exchangers 100, 200 are utilized within cooking system 10 to transfer heat to cooking fluid 14 so that cooking fluid 14 is at a sufficient temperature to carry out the desired cooking reaction (e.g., frying) within cooking vessel 300. Each of the heat exchangers 100, 200 includes one or more burner assemblies 90. Further details of embodiments of burner assemblies 90 are provided below. During operations, burner assemblies 90 are used to combust fuel (e.g., natural gas (methane and/or ethane), propane, butane, methylacetylene, propadiene, or mixtures thereof) to provide heat to the cooking fluid 14 as it flows through heat exchangers 100, 200. In addition, as will be described in more detail below, in this embodiment heat exchanger 100 does not include a burner assembly 90 and instead utilizes heat from thermal oxidizer 40 to increase the temperature of cooking fluid 14 flowing therein.

Figure 2:
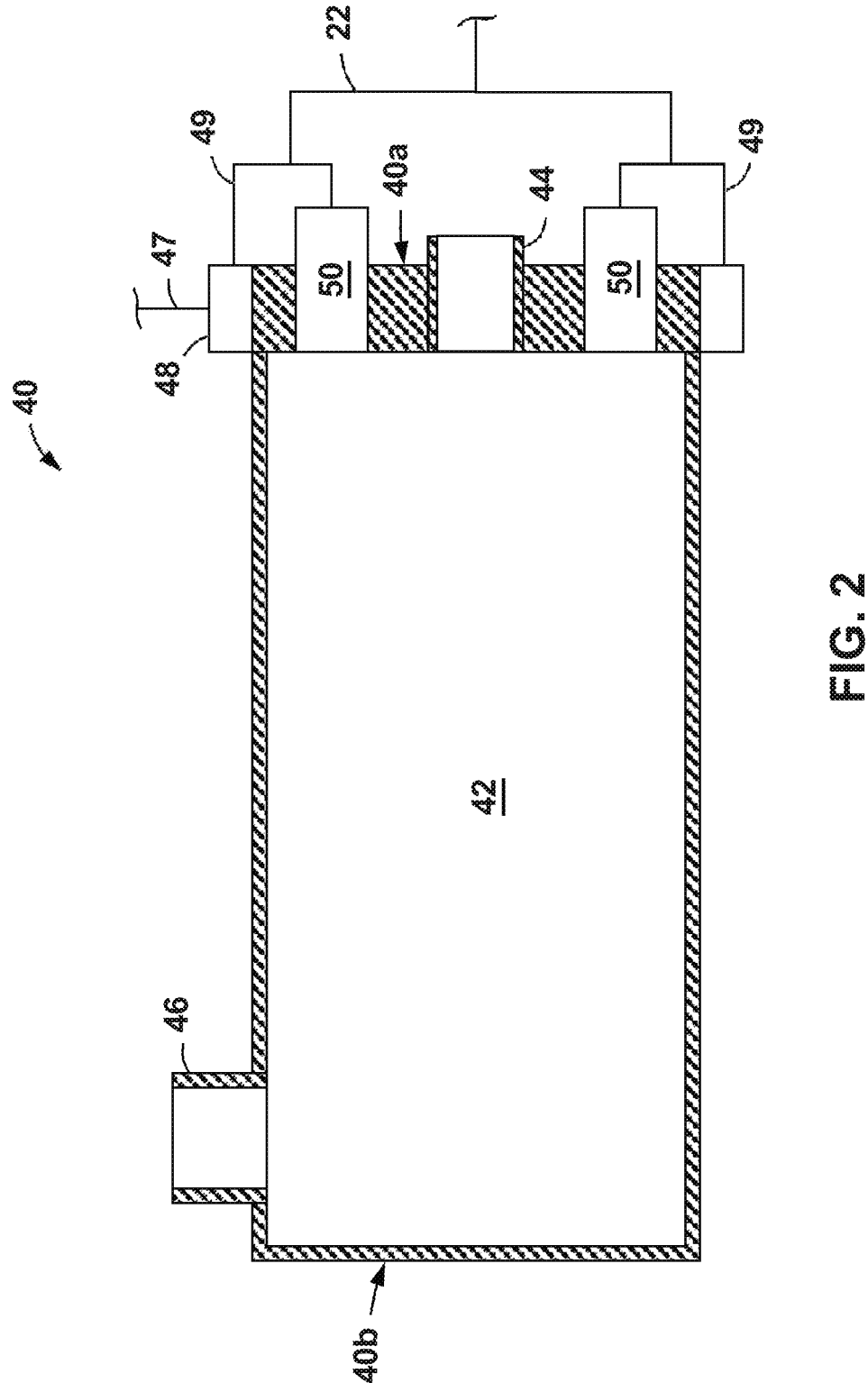
FIG. 2 is a side cross-sectional view of a thermal oxidizer for use within the cooking system of FIG. 1 according to some embodiments.
Figure 21:
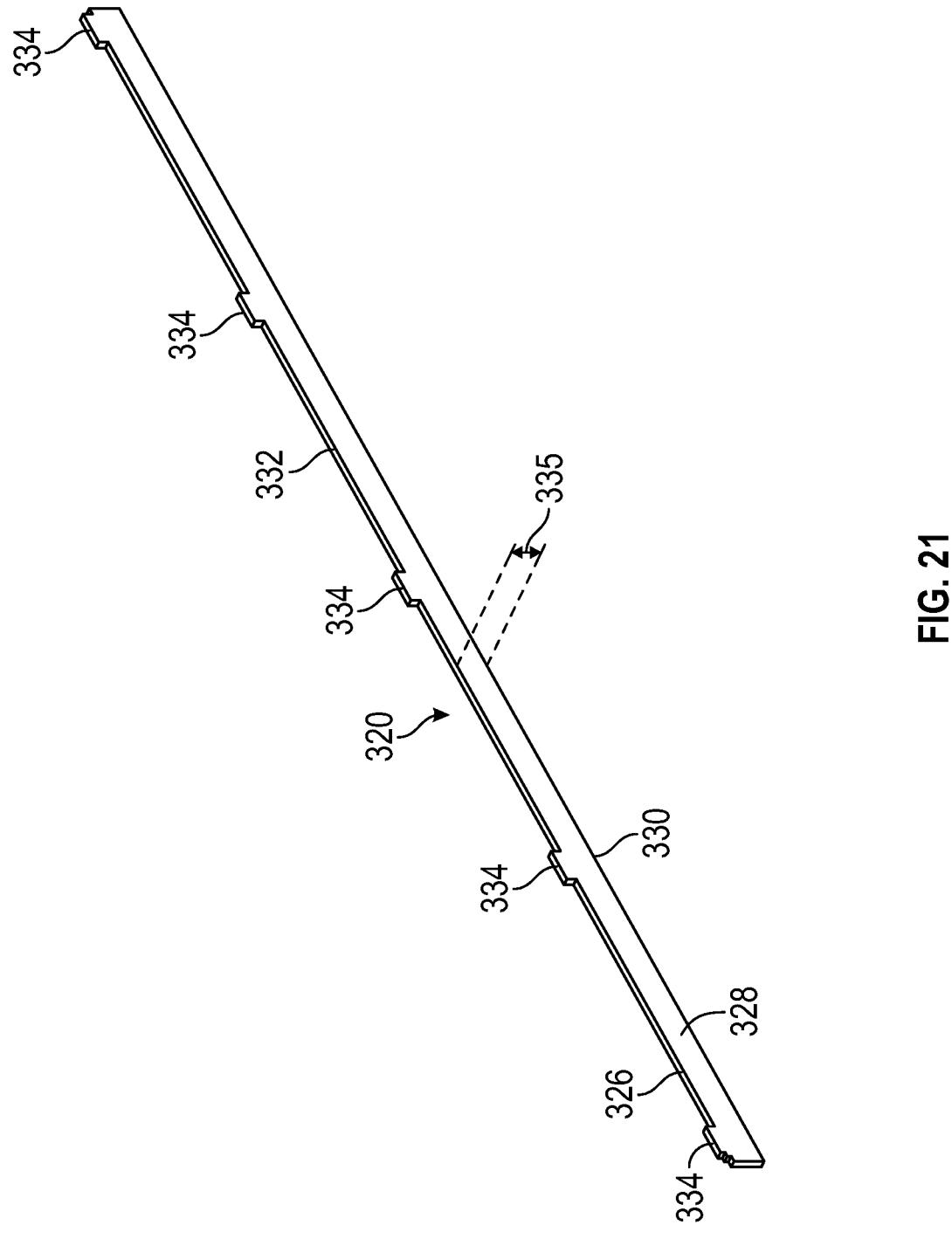
FIG. 21 is a perspective view of a rib of the combustion chamber according to some embodiments.

Referring now to FIGS. 1 and 2, a schematic side cross-sectional view of thermal oxidizer 40 is shown. Thermal oxidizer 40 is a vessel comprising a first or upstream end 40a, a second or downstream end 40b opposite upstream end 40a, and an internal chamber 42. An inlet 44 into internal chamber 42 is disposed at upstream end 40a, and an outlet 46 from internal chamber 42 is disposed proximate downstream end 40b. A plurality of burner assemblies 50 are disposed at upstream end 40a and extend into chamber 42. Further details of embodiments of burner assemblies 50 are provided below. In some embodiments, the burner assemblies 50 may be the same or similar to the burner assemblies 90; however, in some embodiments the burner assemblies 50 may be different from the burner assemblies 90. In some embodiments, the burner assemblies 50 on thermal oxidizer 40 are evenly circumferentially disposed about inlet 44 (or more particularly about a central axis of inlet 44). Fuel (e.g., natural gas, propane, etc.) is provided to burner assemblies 50 from fuel header 21 (which is shown in FIG. 21) via a plurality of fuel supply conduits 22. Fuel header 21 may comprise a supply pipe (or other conduit) or tank that provides a flow of fuel to conduits 22. In some embodiments, fuel header 21 is a main supply pipe of natural gas provided from a local utility service.

A manifold 48 is coupled to thermal oxidizer 40 at upstream end 40a. In this embodiment, manifold 48 is an annular chamber that surrounds oxidizer 40 at upstream end 40a. A supply line 47 provides air (or oxygen) to manifold 48, which is then supplied to fuel supply conduits 22 upstream of burner assemblies 50. As a result, an air/fuel mixture is supplied to burner assemblies 50 via conduits 22, 49 during operations. Upon entering the burner assemblies 50, the air/fuel mixture is combusted such that hot combusted fluids are emitted into thermal oxidizer 40 at upstream end 40a.

Referring still to FIGS. 1 and 2, during operations, a food item (e.g., chips, crackers, frozen foods, etc.) may be placed into cooking vessel 300 to perform a cooking operation (e.g., frying, boiling, etc.). To facilitate the cooking operation, hot cooking fluid 14 is flowed into cooking vessel 300 via conduits 35, 36. Subsequently, the cooking fluid 14 exits cooking vessel 300 via conduit 38 and flows to heat exchanger 100. In addition, cooking fluid 14 may be flowed to heat exchanger 100 from reservoir 12 via conduit 30 as shown in FIG. 1. After exiting the cooking vessel 300, the cooking fluid 14 may flow through a filter assembly 400, which may remove solids, fines, or other contaminants or waste from the cooking fluid 14 before it is flowed to heat exchanger 100 and/or reservoir 12. Further details of embodiments of filter assembly 400 are provided below.

As a result of the interaction between the hot cooking fluid 14 and the food item within vessel 300, hot exhaust gases are emitted from vessel 300 that are captured by vent hood 310 and transferred to inlet 44 of thermal oxidizer 40 via conduit 24 (a blower or other suitable compressing or pumping assembly may be included along conduit 24 to facilitate the flow of fluids from vessel 300 into chamber 42 of thermal oxidizer 40). Upon entering internal chamber 42, the exhaust fluids from cooking vessel 300 are heated by the hot combusted gases also emitted into chamber 42 by burner assemblies 50. In some embodiments, at least some of the exhaust fluids entering chamber 42 at inlet 44 are also ignited by the combustion within burner assemblies 90. The heated gases are flowed through chamber 42 from upstream end 40a to downstream end 40b where they are emitted from chamber 42 at outlet 46 and communicated to heat exchanger 100 via conduit 36.

Within heat exchanger 100, heat is transferred from the exhaust fluids entering exchanger 100 via conduit 36 to the cooking fluid 14 entering heat exchanger 100 via conduits 30, 38. As a result, the temperature of cooking fluid 14 is increased as it flows within exchanger 100, and the hot exhaust fluids from thermal oxidizer 40 are eventually emitted from a duct (not shown) coupled to or integrated with heat exchanger 100. The hot exhaust fluids may be flowed either into the atmosphere or to another tank, vessel, or process.

Upon exiting exchanger 100, the heated cooking fluid 14 may then flow in parallel to each of the heat exchangers 100, 200, via conduits 32. In some embodiments, a single heat exchanger 200 is included within cooking system 10 that receives the heated cooking fluid 14 from heat exchanger 100. Fuel (e.g., natural gas, propane, etc.) is provided to burner assemblies 90 within heat exchangers 100, 200 via conduits 22 and is combusted therein to provide hot combusted fluids (e.g., gases) that are flowed through heat exchangers 100, 200 to further increase the temperature of cooking fluid 14 also flowing there through. As a result, additional heat is transferred to the cooking fluid 14 from the combusted fluids emitted from burner assemblies 90 within heat exchangers 100, 200 such that the cooking fluid 14 is eventually emitted from heat exchangers via conduits 35, 36 at a final cooking temperature. Conduits 35, 36 thereafter provide this heated cooking fluid 14 to vessel 300 to perform the cooking operation as previously described. In some embodiments, air or oxygen may be mixed with the fuel flowing to burner assemblies 90 within exchangers 100, 200 to facilitate the combustion of the fuel therein.

In some embodiments, thermal oxidizer 40 may be omitted from cooking system 10. For instance, in some embodiments, the heat exchanger 100 (or 150) and/or 200 may be fluidly coupled to cooking vessel 300 directly or via filter assembly 400.

Figures 3, 4:
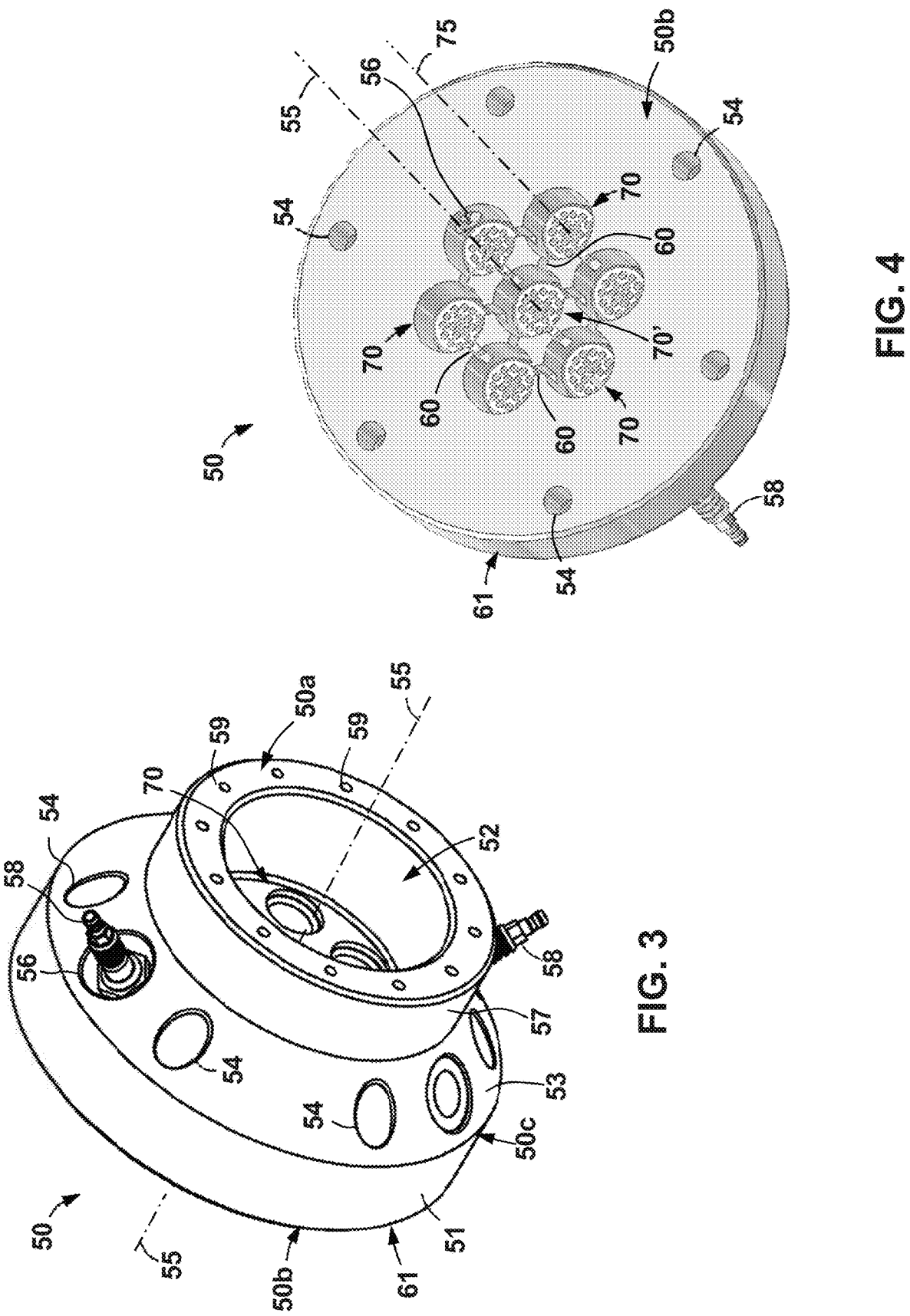
FIG. 3 is a back, perspective view of a burner assembly that may be used within the cooking system of FIG. 1 according to some embodiments.
FIG. 4 is a front, perspective view of the burner assembly of FIG. 3 according to some embodiments.
Figures 5, 6:
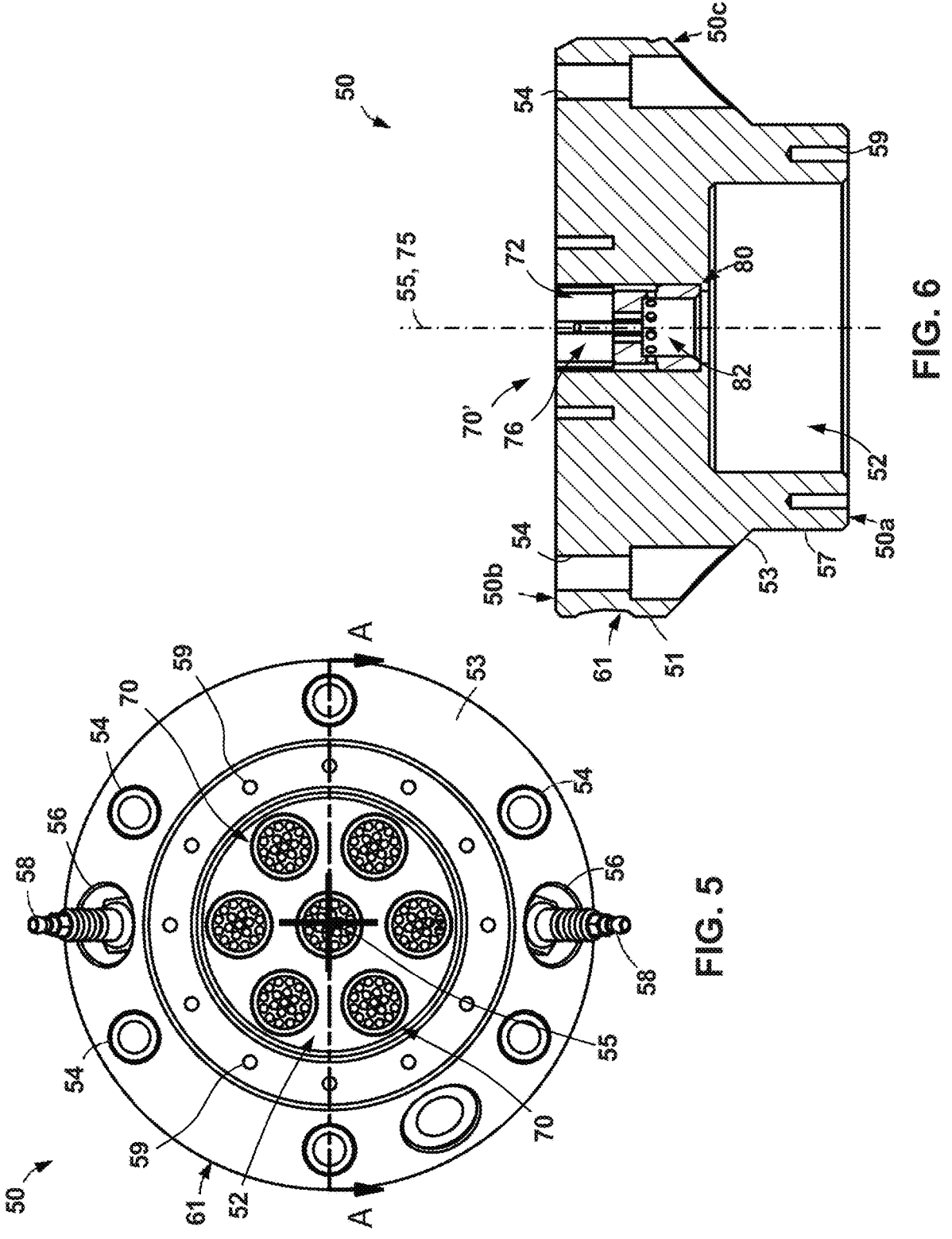
FIG. 5 is a back view of the burner assembly of FIG. 3 according to some embodiments.
FIG. 6 is a cross-sectional view taken along section A-A in FIG. 5 according to some embodiments.

Referring now to FIGS. 3-5, a pair of perspective views and a back view of a burner assembly 50 according to some embodiments is shown. As previously described, in some embodiments the burner assembly 50 (or a plurality of burner assemblies 50) may be used within the thermal oxidizer 40 of cooking system 10 shown in FIG. 1. However, in some embodiments, burner assembly 50 may be utilized in other components of cooking system 10 (e.g., heat exchanger(s) 100, 200).

Burner assembly 50 comprises a generally cylindrical body 61 that includes a central axis 55, a first or upstream end 50a, a second or downstream end 50b opposite upstream end 50a, and a radially outer surface 50c extending axially between ends 50a, 50b. Radially outer surface 50c further includes a first upstream cylindrical surface 57 extending from upstream end 50a, a second or downstream cylindrical surface 51 extending axially from downstream end 50b, and a frustoconical surface 53 between surfaces 51, 57. Downstream cylindrical surface 51 has a larger diameter about axis 55 than upstream cylindrical surface 57 such that frustoconical surface 53 extends radially outward moving axially from upstream cylindrical surface 57 to downstream cylindrical surface 51. A plurality of mounting bores 54 extend axially from frustoconical surface 53 to downstream end 50b that are evenly circumferentially spaced about axis 55. As will be described in more detail below, mounting bores 54 are configured to receive bolts, screws, rivets, or other suitable mounting members to secure burner assembly 50 to another member or structure (e.g., a heat exchanger, vessel, etc.). In addition, a plurality of mounting bores 59 also extend into body 61 from upstream end 50a. Mounting bores 59 may be used to couple piping or other supply conduits to burner assembly 50 (e.g., such as to supply fuel or a fuel air mixture to burner assembly 50).

Body 61 of burner assembly 50 also includes a cylindrical recess or cavity 52 extending axially from upstream end 50a and a plurality of burners 70 extending axially from cavity 52 to downstream end 50b. As shown in FIGS. 4 and 5, each burner 70 has a central or longitudinal axis 75 that extends parallel to axis 55 of burner assembly 50. In this embodiment, burner assembly 50 includes a total of seven burners 70 with one of the burners (identified as burner 70') coaxially aligned with burner assembly 50 and the remaining six burners 70 evenly circumferentially spaced about axis 55. In particular, in this embodiment, axis 75 of central burner 70' is aligned with axis 55 of burner assembly 50, and the axes 75 of the remaining burners 70 are all parallel to and radially offset from axis 55 of burner assembly 50. It should be appreciated that generic references to burners 70 is meant to encompass all of the burners 70 on burner assembly 50 (including central burner 70').

Figure 7:
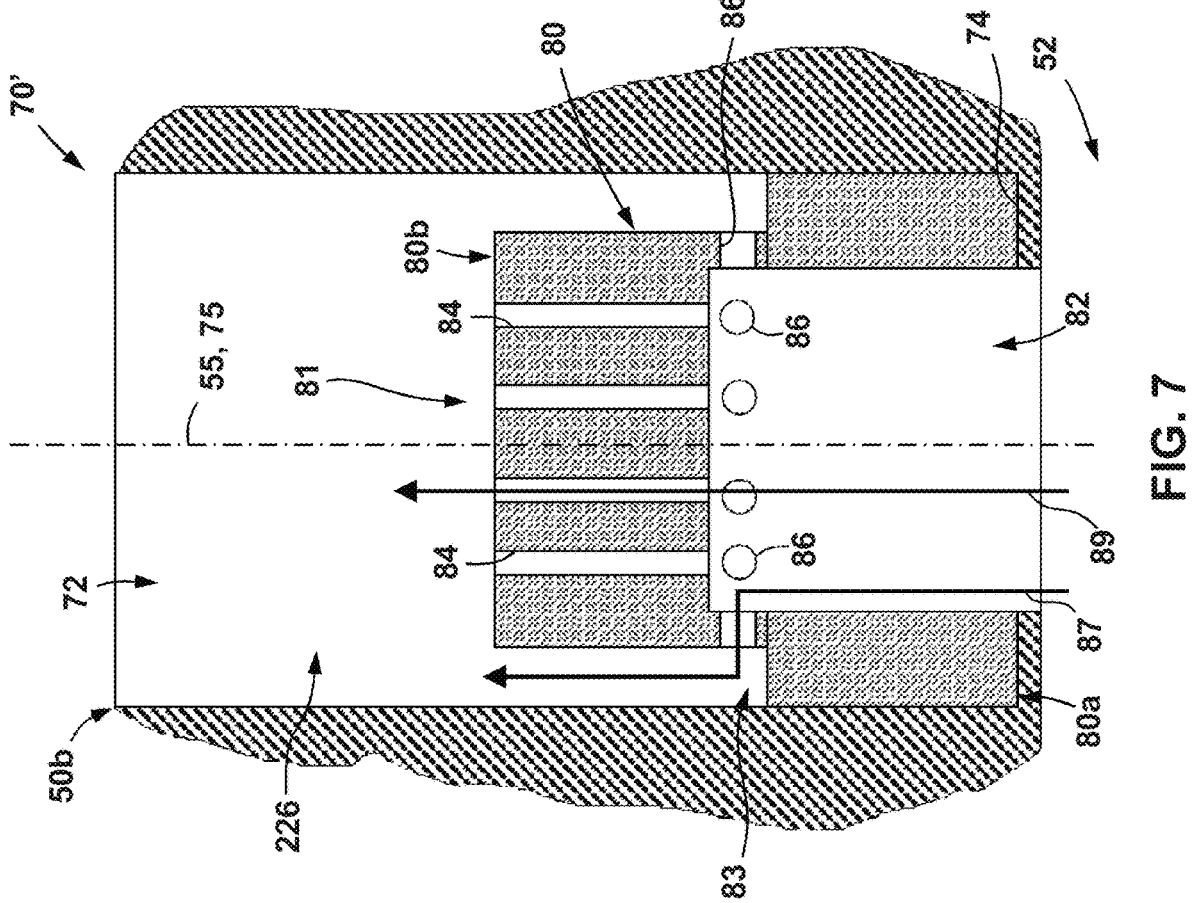
FIG. 7 is a cross-sectional view of a burner of the burner assembly of FIG. 3 according to some embodiments.

Referring now to FIGS. 6 and 7, cross-sectional views of burner assembly 50 and central burner 70' are shown. It should be appreciated that the details described below for burner 70' are also applicable to describe the features of the other burners 70, except that axis 75 of the remaining burners 70 are not aligned with axis 55 as previously described above. Thus, a separate description of the other burners 70 is omitted herein in the interest of brevity.

Burner 70' comprises a bore 72 (bore 72 may be referred to herein as a "burner bore 72") extending axially from downstream end 50b of body 61 to cavity 52 and an insert 80 disposed within bore 72. Insert 80 is coaxially aligned with axis 75 and includes a first or upstream end 80a, a second or downstream end 80b opposite upstream end 80a, a recess or cavity 82 extending axially from upstream end 80a, a plurality of first bores 84 extending axially from cavity 82 to downstream end 80b, and a plurality of second bores 86 extending radially from cavity 82. As best shown in FIG. 7, insert 80 is disposed within bore 72 such that upstream end 80a engages or abuts with a radially extending annular shoulder 74 within bore 72 such that cavity 82 is in communication with cavity 52 of body 61. In addition, bore 72 and upstream end 50*b* of burner assembly 50 are in communication with cavity 82 (and thus also cavity 52) through each of the plurality of first bores 84 and the plurality of second bores 86.

Each burner 70' defines a plurality of first flow paths 89 extending from cavity 82, axially through bores 84 and into bore 72 toward downstream end 50*b*, and a plurality of second flow paths 87 extending from cavity 82 radially through bores 86 and then axially through bore 72 toward downstream end 50*b*. As will be described in more detail below, bore 72 (or the portion of bore 72 that is not occupied by insert 80) forms a combustion chamber 76 that receives fuel (or an air/fuel mixture) from both the first flow paths 89 and the second flow paths 87 that may be ignited therein. However, because the fuel (or air/fuel mixture) flowing through the plurality of second flow paths 87 first flows radially from cavity 82 into bore 72 (or combustion chamber 76), the fluids flowing along second flow paths 87 flow at a slower velocity (and thus at a lower flow rate) than the fluids flowing along plurality of first flow paths 89. In other words, without being limited to any particular theory, the radial flow of fluids along second flow paths 87 causes impact of the fluids with the inner wall of bore 72, thereby reducing the kinetic energy for these fluid flows and decreasing their velocity as compared to the fluids flowing axially through first flow paths 89. Also, the relatively smaller diameter of the bores 84 compared with cavity 82 causes an increase in velocity of the fluids flowing along flow paths 89 upon entering bores 84. As a result, burner 70' defines a first sub-burner 81 (or high velocity burner) fed by flow paths 89, and a second sub-burner 83 (or low velocity burner) fed by flow paths 87 (FIG. 7). In particular, second sub-burner 83 is annularly or circumferentially disposed about first sub-burner 81 with respect to axis 75.

In addition, the increased velocity through flow paths 89 due to the constrictions created within the relatively smaller diameter first bores 84 also allows for higher velocities of combusted fuel (or air/fuel mixture) through the first sub-burner 81 from relatively smaller flow rates of fuel (or fuel/air mixture) through cavity 52. This may further enhance the ability of burner assembly 50 to deliver a flow of combusted fluids at a sufficiently high velocity to overcome any back pressure imposed by the internal structure of an associated heat exchanger of vessel (e.g., heat exchangers 100, 200, thermal oxidizer 40).

Referring now to FIGS. 3, 4, and 7, a plurality of slots 60 extend through burner assembly 50 to place the combustion chambers 76 of adjacently disposed burners 70 in fluid communication with one another. As a result, in this embodiment, the combustion chambers 76 of all of the burners 70 on burner assembly 50 are in fluid communication with one another either directly or indirectly via the slots 60. Further, a pair of spark plugs 58 (or other suitable igniter member) are inserted partially into the combustion chambers of two of the burners 70 (however, more or less than two spark plugs 58 may be used in other embodiments) through corresponding angled bores 56 extending from frustoconical surface 53. As a result, spark plugs 58 may be utilized to ignite fuel (or air/fuel mixture) disposed within combustion chambers 76 of burners 70.

In operation, burner assembly 50 is configured to combust fuel and/or an air/fuel mixture through the plurality of burners 70. Initial combustion (or ignition) of the fuel and/or air/fuel mixture within burners 70 is achieved via one or both of the spark plugs 58, and this initial combustion subsequently spreads to the other burners 70 via slots 60. Within each burner 70, the fuel and/or fuel mixture enters chamber 76 via sub-burners 81, 83 and ignites therein. In at least some operations, the velocity of the combusted fuel and/or combusted air/fuel mixture through the first-sub burners 81 is such that they may experience so-called "lift off" where the flame is extinguished due to the high velocity. However, the lower velocity of the combusted fuel and/or fuel/air mixture exiting second sub-burners 83 (which have a slower flow rate due to the radially directed bores 86 as previously described) may prevent this "lift off" by continuously burning fuel at a lower flowrate and/or delivering a combusted air/fuel mixture at a lower velocity. In addition, if any of the burners 70 should experience a total loss of combustion (e.g., due to "lift-off," temporary lack of fuel, or another reason), then the fluid communication between the burners 70 via slots 60 may allow for re-ignition from an adjacent burner 70 that is still combusting fuel therein.

Additionally, while not shown specifically in FIGS. 3-7, additional adjacent burners (e.g., ribbon burners) and/or deflectors may also be incorporated onto or adjacent to burner assembly 50, so that additional reliability may be achieved during operations with burner assembly 50. Further, burner assembly 50 may comprise one or more infrared burners. Accordingly, the burners 70 (including sub-burners 81, 83) and/or the possible additional adjacent burners discussed above may comprise additional components including but not limited to, ceramic components and/or other components necessary to configure and/or operate burners 70 (or the additional adjacent burners) as infrared burners.

Figure 8:
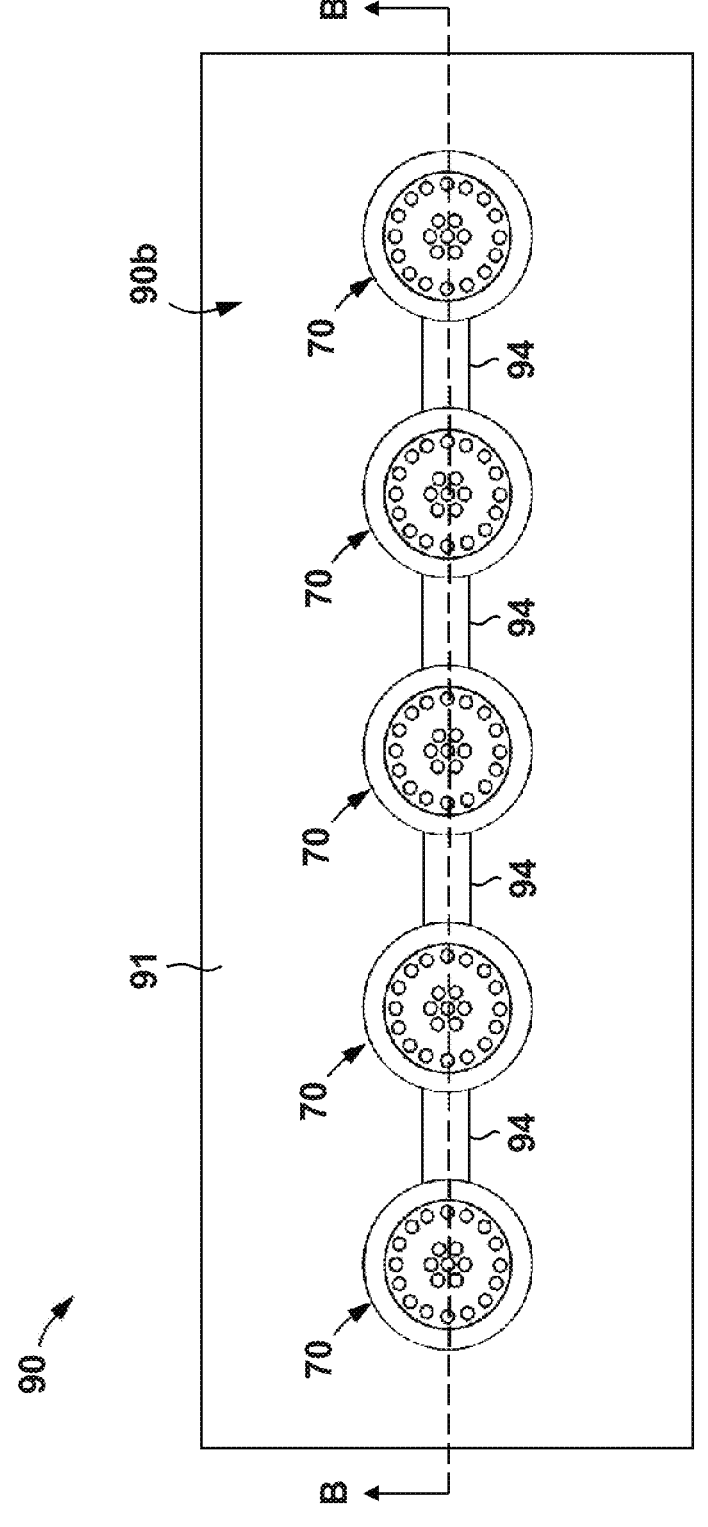
FIG. 8 is a top view of a burner assembly that may be used within the cooking system of FIG. 1 according to some embodiments.
Figure 9:
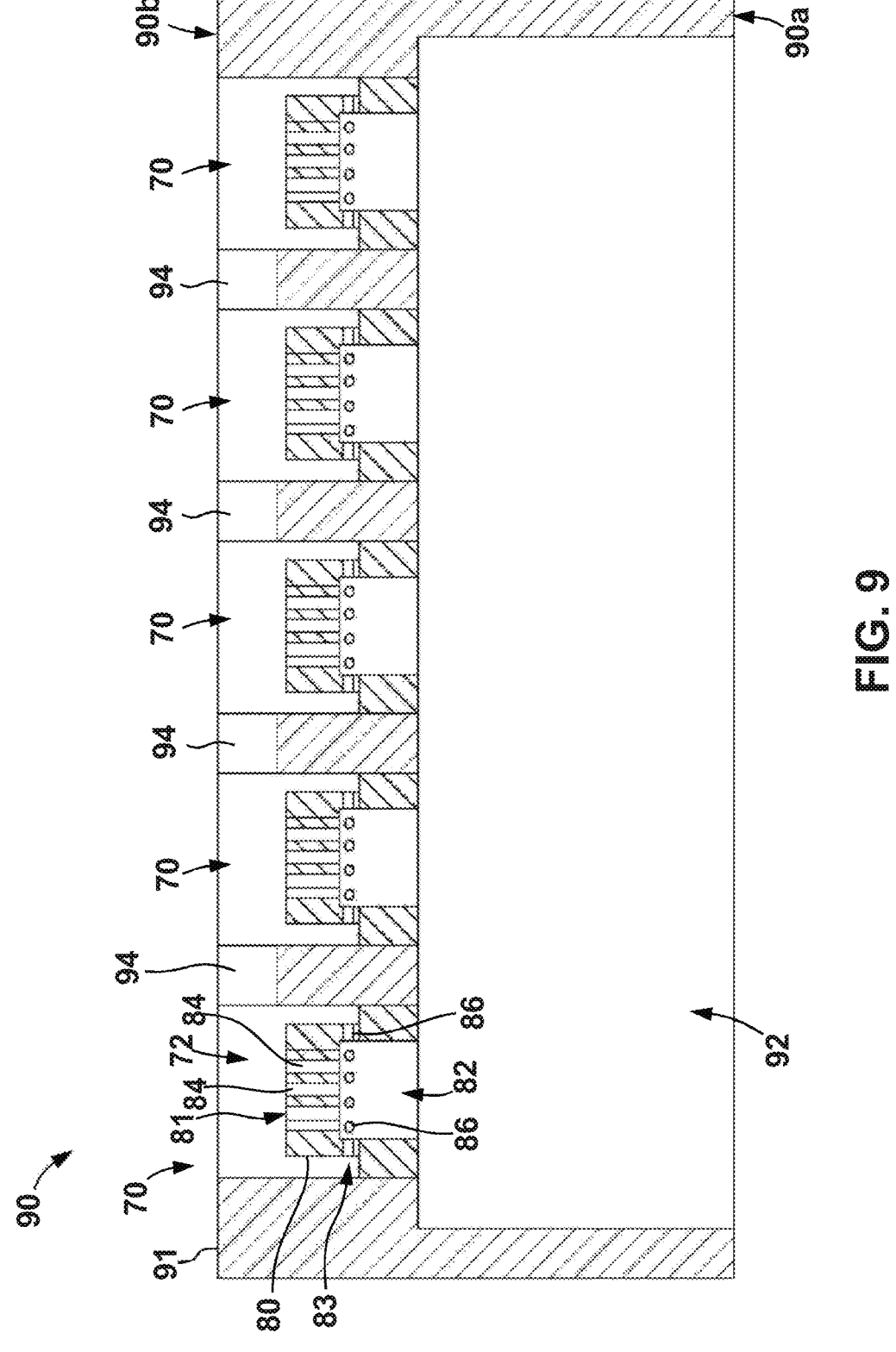
FIG. 9 is a cross-sectional view taken along section B-B in FIG. 8 according to some embodiments.

Referring now to FIGS. 8 and 9, a top and cross-sectional view of a burner assembly 90 according to some embodiments is shown. As previously described, in some embodiments the burner assembly 90 (or a plurality of burner assemblies 90) may be used within the heat exchanger(s) 200 of cooking system 10 shown in FIG. 1. However, in some embodiments, burner assembly 90 may be utilized in other components of coking system 10 (e.g., thermal oxidizer 40, heat exchanger 100, etc.).

Burner assembly 90 comprises a generally rectangular parallelepiped shaped body 91 that includes a first or upstream end 90*a* and a second or downstream end 90*b* opposite upstream end 90*a*. A recess or cavity 92 extends into body 90 from upstream end 90*a* and a plurality of burners 70 extend from cavity 92 to downstream end 90*b*. The burners 70 may each be the same as the burners 70 previously described above for burner assembly 50. Thus, as best shown in FIG. 9, each burner 70 may include an insert 80 that further includes a cavity 82 in communication with cavity 92, a plurality of first bores 84 that define a first sub-burner 81 (or high velocity burner), and a plurality of second bores 86 that define a second sub-burner 83 (or low velocity burner) as previously described.

In some embodiments, the burners 70 are positioned side-by-side in a linear arrangement. However, other arrangements of the burners 70 are contemplated on burner assembly 90 (e.g., a grid of rows and columns, a curved line, etc.). A plurality of slots 94 extend into downstream end 90*b* of body 91 to place the bores 72 (e.g., or combustion chambers 76 shown in FIG. 7) of adjacently disposed burners 70 in fluid communication with one another.

In operation, burner assembly 90 is configured to combust fuel and/or an air/fuel mixture through the plurality of burners 70. Within each burner 70, the fuel and/or fuel mixture enters chamber 76 via sub-burners 81, 83 and ignites therein. In at least some operations, the velocity of the combusted fuel and/or combusted air/fuel mixture through the first-sub burners 81 is such that they may experience so-called "lift off" where the flame is extinguished due to the high velocity. However, the lower velocity of the combusted fuel and/or fuel/air mixture exiting second sub-burners 83 (which have a slower flow rate due to the radially directed bores 86 as previously described) may prevent this "lift off" by continuously burning fuel at a lower flowrate and/or delivering a combusted air/fuel mixture at a lower velocity. In addition, if any of the burners 70 should experience a total loss of combustion (e.g., due to "lift-off," temporary lack of fuel, or another reason), then the fluid communication between the burners 70 via slots 94 may allow for re-ignition from an adjacent burner 70 that is still combusting fuel therein.

Additionally, while not shown specifically in FIGS. 8 and 9, additional adjacent burners (e.g., ribbon burners) and/or deflectors may also be incorporated onto or adjacent to burner assembly 90, so that additional reliability may be achieved during operations with burner assembly 50. Further, burner assembly 90 may comprise one or more infrared burners. Accordingly, the burners 90 (including sub-burners 81, 83) and/or the possible additional adjacent burners discussed above may comprise additional components including but not limited to, ceramic components and/or other components necessary to configure and/or operate burners 70 (or the additional adjacent burners) as infrared burners.

Figures 10, 11:
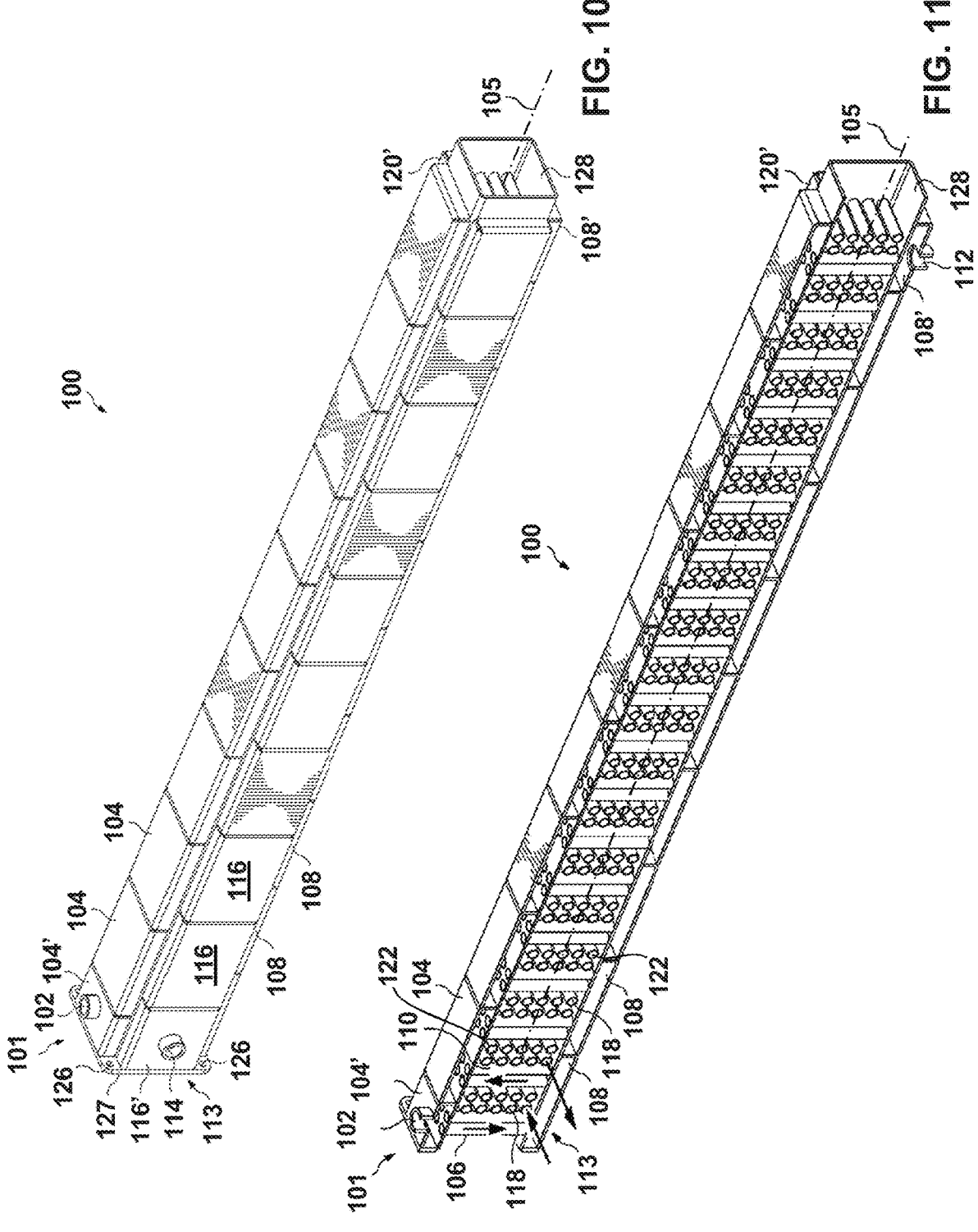
FIG. 10 is a perspective view of a heat exchanger that may be used within the cooking system of FIG. 1 according to some embodiments.
FIG. 11 is a perspective, cross-sectional view of the heat exchanger of FIG. 10 according to some embodiments.
Figure 12:
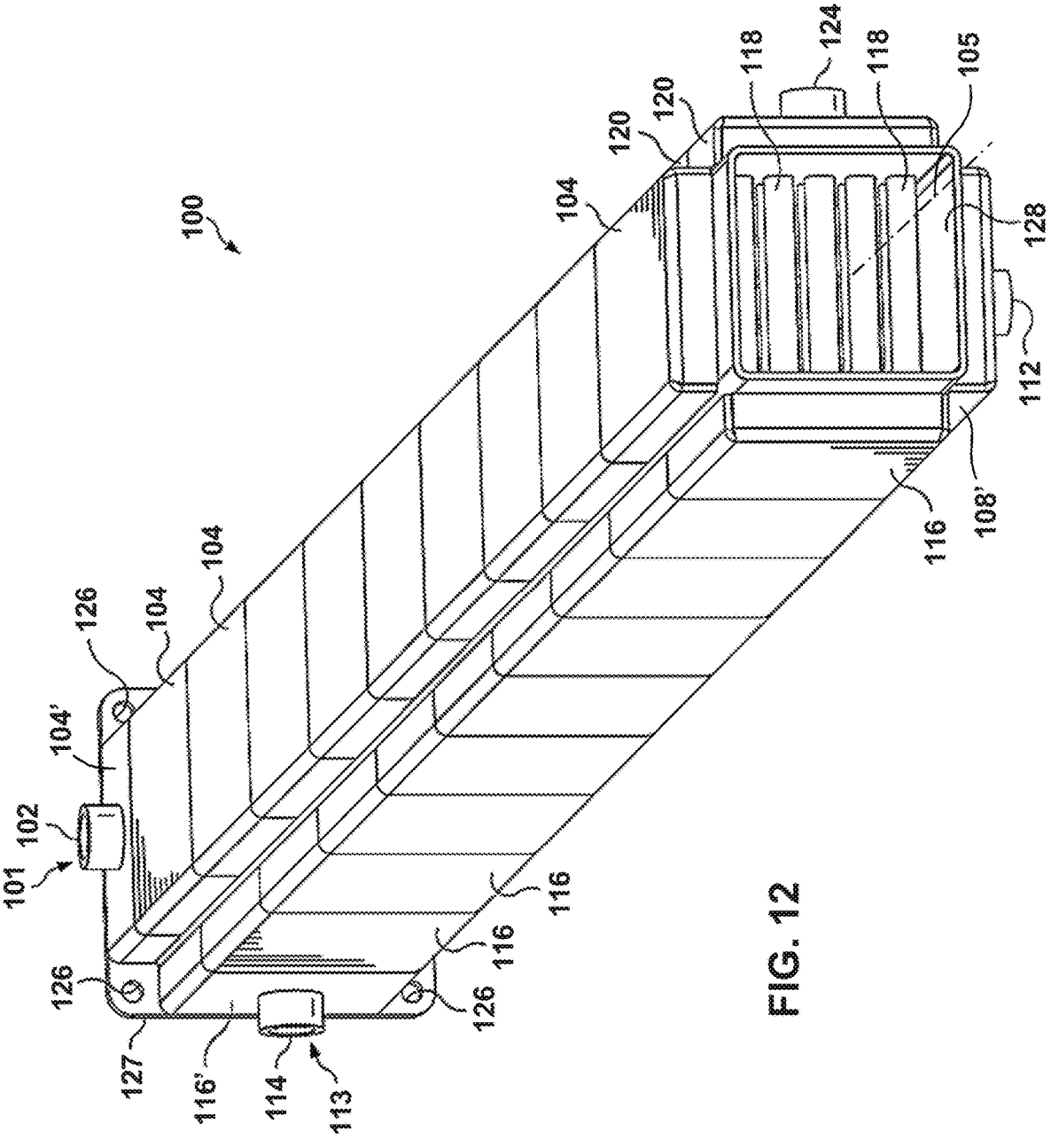
FIG. 12 is another perspective view of the heat exchanger of FIG. 10 according to some embodiments.

Referring now to FIGS. 10-12, an oblique side view, an oblique cross-sectional side view, and an oblique end view of an embodiment of heat exchanger 100 are shown. Referring briefly again to the cooking system 10 of FIG. 1, as previously described, within the heat exchanger 100 heat is transferred from the exhaust fluids entering exchanger 100 via conduit 36 to the cooking fluid 14 entering heat exchanger 100 from thermal oxidizer 40 via conduits 30, 38.

Referring back to FIGS. 10-12, the heat exchanger 100 includes a longitudinal axis 105 and defines a first fluid circuit 101 and a second fluid circuit 113. The first fluid circuit 101 includes an inlet 102, an outlet 112, a plurality of first headers 104, a plurality of second headers 108, a plurality of first tubes 106, and a plurality of second tubes 110. The plurality of first headers 104 are positioned on a radially opposite side of heat exchanger 100 (with respect to axis 105) from the plurality of second headers 108. In addition, the plurality of first tubes 106 and the plurality of second tubes 110 extend between and fluidly communicate the plurality of first headers 104 with the plurality of second headers 108.

The inlet 102 is connected in fluid communication with one of the first headers 104 (which is designated with the reference numeral 104' in FIGS. 10-12) and is configured to receive a fluid there through and allow the fluid to enter the top header 104'. The first header 104' is connected in fluid communication with a first set of the first tubes 106, which is connected in fluid communication with a second header 108 (e.g., that is positioned radially opposite the first header 104'). Fluid from the first header 104' may flow through the first set of first tubes 106 into a second header 108. The second header 108 may also be connected in fluid communication with a set of second tubes 110 that may carry fluid from the second header 108 through the first tubes 110 and into another first header 104 (e.g., a first header 104 that is immediately axially adjacent the first header 104'). Accordingly, this pattern may continue along the axial length of the heat exchanger 100, such that each first header 104 transfers fluid through a set of first tubes 106 into a second header 108 and subsequently from the second header 108 through a set of second tubes 110 into an adjacently downstream located first header 104.

Furthermore, it will be appreciated that second tubes 106 may be associated with carrying a fluid from a first header 104 in a radial direction (with respect to axis 105) across heat exchanger 100 towards and into a second header 108, and second tubes 110 may be associated with carrying a fluid from a second header 108 in radial direction (e.g., with respect to axis 105) across heat exchanger 105 towards and into a first header 104. This pattern may continue along the axial length of the heat exchanger 100 until a last set of first tubes 106 carries fluid through into a final second header 108 (which is designated with the reference numeral 108' in FIGS. 10-12) and out of the outlet 112. Accordingly, the first fluid circuit 101 comprises passing fluid from the inlet 102 into the first header 104' through a repetitive serpentine series of first tubes 106, a second header 108, a set of second tubes 110, and a first header 104 until passing through a final set of second tubes 106 into the final second header 108' and exiting the heat exchanger 100 through the outlet 112. Furthermore, in other embodiments, it will be appreciated that the inlet 102 and/or the outlet 112 may alternatively be disposed both in a first header 104, both in a second header 108, or in opposing first and second headers 104, 108.

The heat exchanger 100 also comprises a second fluid circuit 113 having an inlet 114, an outlet 124, a plurality of third headers 116, a plurality of fourth headers 120, a plurality of third tubes 118, and a plurality of fourth tubes 122. The plurality of third headers 116 are positioned on a radially opposite side of heat exchanger 100 (with respect to axis 105) from the plurality of fourth headers 120. In addition, the plurality of third tubes 118 and the plurality of fourth tubes 122 extend between and fluidly communicate the plurality of third headers 116 with the plurality of fourth headers 122. The third tubes 118 and the fourth tubes 122 may be oriented substantially perpendicular to the first tubes 106 and the second tubes 110 of the first fluid circuit 101. The inlet 114 is connected in fluid communication with one of the third headers 116 (which is designated with the reference numeral 116' in FIGS. 10-12) and is configured to receive a fluid there through and allow the fluid to enter the third header 116'. The third header 116' is connected in fluid communication with a first set of third tubes 118, which is connected in fluid communication with a fourth header 120 (e.g., that is positioned radially opposite the third header 116'). Thus, fluid from the third header 116' may flow through the first set of third tubes 118 into a fourth header 120. The fourth header 120 may also be connected in fluid communication with a set of fourth tubes 122 that may carry fluid from the fourth header 120 through the third tubes 122 and into another third header 116 (e.g., a third header 116 that is immediately axially adjacent the third header 116'). Accordingly, this pattern may continue along the length of the heat exchanger 100, such that each third header 116 transfers fluid through a set of third tubes 118 into a fourth header 120 and subsequently from the fourth header 120 through a set of fourth tubes 122 into an adjacently downstream located third header 116.

Furthermore, it will be appreciated that third tubes 118 may be associated with carrying a fluid from a third header 116 in a radial direction towards and into a fourth header 120, and fourth tubes 122 may be associated with carrying a fluid from a fourth header 120 in a radial direction towards and into a third header 116. This pattern may continue along the axial length of the heat exchanger 100 until a last set of third tubes 118 carries fluid through into a final fourth header 120 (which is designated with the reference numeral 120' in FIGS. 10-12) and out of the outlet 124. Accordingly, the second fluid circuit 113 comprises passing fluid from the inlet 114 into the third header 116' through a repetitive serpentine series of a set of third tubes 118, a third header 120, a set of fourth tubes 122, and a third header 116 until passing through a final set of fourth tubes 118 into the final fourth header 120' and exiting the heat exchanger 100 through the outlet 124. Furthermore, in other embodiments, it will be appreciated that the inlet 114 and/or the outlet 124 may alternatively be disposed both in a third header 116, both in a fourth header 120, or in opposing third and fourth headers 116, 120. Additionally, it will be appreciated that in some embodiments, the heat exchanger 100 may comprise only one of the first fluid circuit 101 and the second fluid circuit 113.

First fluid circuit 101 and the second fluid circuit 113 may comprise different lengths. Accordingly, the first inlet 102 and/or the outlet 112 may be disposed in any of the first headers 104 or second headers 108, and the inlet 114 and/or the outlet 124 may be disposed in any of the third headers 116 and the fourth headers 120 to vary the length of the fluid circuits 101, 113, respectively. By altering the length of the fluid circuits 101, 113, the heat exchanger 100 may be configured to maintain a temperature gradient, reduce a pressure drop, and/or otherwise control the temperature and/or pressure of the fluid though each of the fluid circuits 101, 113.

The tubes 106, 110, 118, 122 of the heat exchanger 100 may generally be arranged to provide a compact, highly resistive flowpath through the fluid duct 128. In order to effectively and/or evenly distribute the heat produced by a coupled burner assembly (which may comprise burner assembly 50 or burner assembly 90) through the tubes 106, 110, 118, 122, sets and/or rows of tubes 106, 110 may be interstitially and/or alternatively spaced with sets and/or rows of tubes 118, 122. In the shown embodiment, two rows of first tubes 106, two rows of third tubes 118, two rows of second tubes 110, and two rows of fourth tubes 122 are interstitially and/or alternatively spaced, respectively, along the length of the heat exchanger 100. However, in alternative embodiments, a single row of tubes 106, 110, 118, 122 may be interstitially and/or alternatively spaced, respectively, along the length of the heat exchanger 100. In other embodiments, however, heat exchanger 100 may comprise any number of rows of tubes 106, 110, 118, 122 interstitially and/or alternatively spaced along the length of the heat exchanger 100. For example, heat exchanger 100 may comprise three rows of first tubes 106, two rows of third tubes 118, three rows of second tubes 110, and two rows of fourth tubes 122 may be interstitially and/or alternatively spaced. Accordingly, it will be appreciated that the number of rows of tubes 106, 110, 118, 122 interstitially and/or alternatively spaced may vary, so long as at least one row of radially-oriented tubes 106, 110 is disposed adjacently with at least one row of radially-oriented tubes 118, 122 along the length of the heat exchanger 100.

Heat exchanger 100 also comprises a plurality of mounting holes 126 disposed through a mounting flange 127 that is disposed at the distal end of the heat exchanger 100 located closest to the inlet 102 and the inlet 114. The mounting holes 126 may generally be configured to mount the heat exchanger 100 to a burner assembly (e.g., burner assembly 50, 90), to thermal oxidizer 40, or another suitable component or structure. In some embodiments, the heat exchanger 100 may be secured to another component or structure via fasteners such as bolts, rivets, etc. However, in other embodiments, the heat exchanger 100 may be secured to another component or structure through an alternative mechanical interface (e.g., plate, adapter, etc.). While mounting flange 127 is shown as having a rectangular (or square) shape, it should be appreciated that flange 127 may be differently shaped or formed (e.g., flange 127 may be circular or curved in shape) to accommodate the connection between the corresponding component or structure burner assembly and heat exchanger 100. During operations, combusted fuel and/or combusted air/fuel mixture is forced through a plurality of inner walls of the heat exchanger 100 that form a fluid duct 128 through the heat exchanger 100. Accordingly, heat from the combusted fuel and/or the combusted air/fuel mixture may be absorbed by a fluid flowing through the tubes 106, 110, 118, 122 of the heat exchanger 100. The heated fluid may exit the heat exchanger 100 through the first outlet 112 and the second outlet 124 of the first fluid circuit 101 and the second fluid circuit 113, respectively, and therefore be used to heat and/or cook consumable products (i.e., chips, crackers, frozen foods).

In operation, the configuration of tubes 106, 110, 118, 122 provides a compact, highly resistive flow path through the fluid duct 128. Accordingly, to force combusted fuel and/or combusted air/fuel mixture through the fluid duct 128 requires high velocity. Accordingly, the velocity of the combusted fuel and/or the combusted air/fuel mixture through the fluid duct 128 is high enough to provide the requisite velocity needed to overcome the resistance to flow through the heat exchanger 100. Thus, the high velocity sub-burners 81 within the burner assemblies 50, 90 (FIGS. 7 and 9) may be configured to emit combusted fuel and/or air/fuel mixture at a sufficient velocity to overcome the flow resistance through the heat exchanger 100 (particularly of fluid duct 128).

Figure 13:
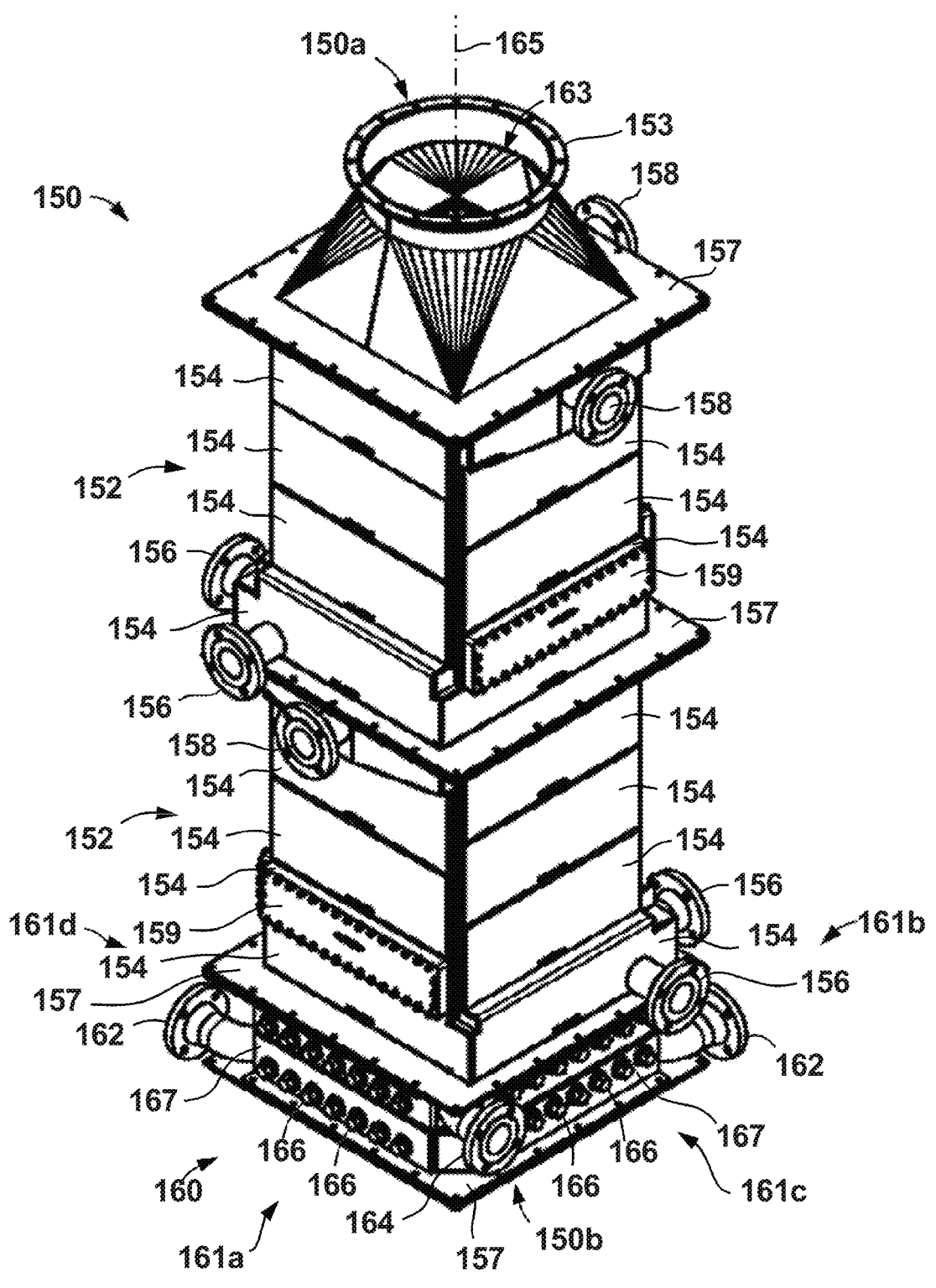
FIG. 13 is a perspective view of another heat exchanger that may be used within the cooking system of FIG. 1 according to some embodiments.

Referring now to FIG. 13, a perspective view of a heat exchanger 150 that may be used in place of the heat exchanger 100 within the cooking system 10 of FIG. 1 according to some embodiments is shown. Heat exchanger 150 includes a central or longitudinal axis 165, a first end 150a and a second end 150b that is opposite the first end 150a. In some embodiments, the heat exchanger 150 is arranged in a vertical orientation such as is shown in FIG. 13. As a result, the first end 150a may be referred to herein as an "upper end" 150a and the second end 150b may be referred to herein as a "lower end" 150b. However, it should be appreciated that heat exchanger 150 may be arranged in other orientations (e.g., such as a horizontal orientation), so the use of the terms "upper end" and "lower end" with reference to ends 150a and 150b, respectively, is not intended to limit all possible embodiments of heat exchanger 150.

In addition, heat exchanger 150 includes a plurality of modules 152, 160 axially coupled end-to-end along the axis 165. In particular, heat exchanger 150 includes an inlet module 160 and a plurality of heat exchanger modules 152. An outlet nozzle 153 is coupled to one of the heat exchanger modules 152 such that the outlet nozzle 153 is positioned at the upper end 150a, the inlet module 160 is positioned at the lower end 150b, and the plurality of heat exchanger modules 152 extend end-to-end axially between the inlet module 160 and the outlet nozzle 153. Each of the heat exchanger modules 152 and the inlet module 160 has a generally rectangular (or square) cross-section along axis 165; however, other shapes are contemplated in other embodiments. It should be appreciated that in some embodiments, the heat exchanger 150 may include a single heat exchanger module 152 or more than two heat exchanger modules 152.

Figure 14:
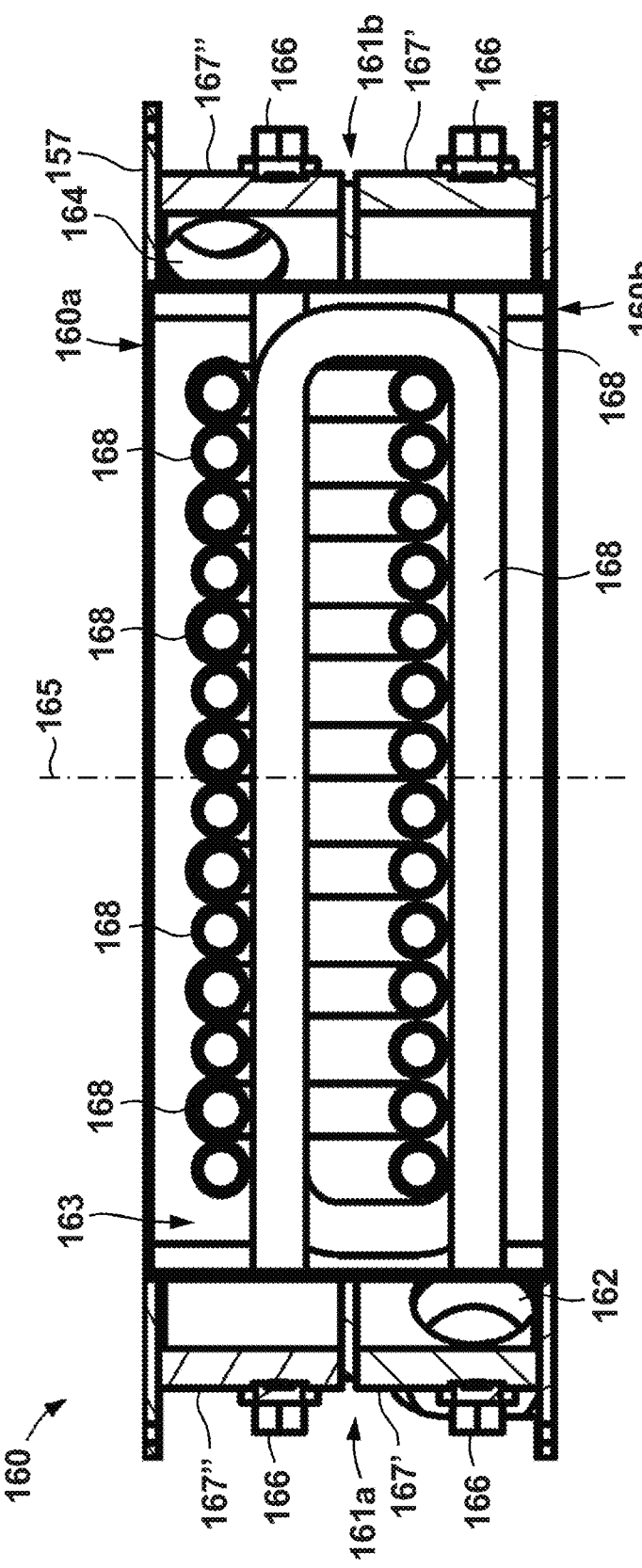
FIG. 14 is a side, cross-sectional view of an inlet module of the heat exchanger of FIG. 13 according to some embodiments.

Referring now to FIGS. 13 and 14, inlet module 160 includes a first or upper end 160a and a second or lower end 160b opposite upper end 160a. Inlet module 160 may be coupled to the heat exchanger module 152 at the upper end 160a. In addition, inlet module 160 includes a plurality of headers 167 positioned about the outer perimeter of inlet module 160. In some embodiments, inlet module 160 includes a total of eight headers 167 positioned along the four rectangular sides 161a, 161b, 161c, 161d of inlet module 160 so that each rectangular side 161a, 161b, 161c, 161d of inlet module 160 has a two axially headers 167, and each header 167 is radially opposite another of the headers 167 in a similar manner to that described above for headers 104, 108, 116, 120 of heat exchanger 100 (FIGS. 10-12). Specifically, each rectangular side 161a, 161b, 161c, 161d of inlet module 160 may comprise a first or lower header 167 (which is identified with the reference numeral 167' in the drawings) at (or proximate to) the lower end 160b, and a second or upper header 167 (which is identified with the reference numeral 167" in the drawings) at (or proximate to) the upper end 160a. Due to the rectangular cross-section of inlet module 160, the side 161a is radially opposite the side 161b, and the side 161c is radially opposite the side 161d with respect to the axis 165.

A plurality of inlets 162 are fluidly coupled to the lower headers 167' and a plurality of outlets 164 (note: only one outlet 164 is visible in FIG. 13) are fluidly coupled to the upper headers 167". The inlets 162 and outlets 164 me be positioned at the corners or junctions of circumferentially adjacent ones of the sides 161a, 161b, 161c, 161d. Specifically, one inlet 162 may be positioned at the corner or junction of the sides 161a, 161d, and another inlet 162 may be positioned at the corner or junction of the sides 161c, 161b. Likewise, one outlet 164 may be positioned at the corner or junction of the sides 161a, 161c, and another outlet 164 (not specifically shown in FIG. 13) may be positioned at the corner or junction of the sides 161b, 161d. Without being limited to this or any other theory, by placing the inlets 162 and outlets 164 at the corners of the inlet module 160, each inlet 162 may be in parallel fluid communication with two lower headers 167' that are circumferentially adjacent one another about axis 165, and each outlet 164 may in parallel fluid communication with two upper headers 167" that are circumferentially adjacent one another about axis 165. Thus, the placement of the inlets 162 and outlets 164 at the corners of inlet module 160 may reduce piping to and from inlet module 160.

In addition, inlet module 160 includes a plurality of tubes 168 that fluidly couple the lower headers 167' with the upper headers 167". Specifically, each tube 168 is configured in a U-tube arrangement to fluidly couple the lower header 167' with the upper header 167" on a given side 161a, 161b, 161c, 161d of inlet module 160. Thus, each of the tubes 168 that extend from the lower header 167' on the side 161a may extend radially across the inlet module 160 and then may bend axially upward and return radially across inlet module 160 to the upper header 167" on the side 161a. Likewise, each of the tubes 168 coupled to the lower headers 167' on the sides 161b, 161c, 161d may also extend in a U-tube arrangement to the upper header 167" on the same sides 161b, 161c, 161d, respectively. In addition, the tubes 168 may be interleaved with other tubes 168 extending between headers 167', 167" on a radially opposite side of the inlet module 160. Thus, the tubes 168 extending between the headers 167', 167" on the side 161a may be interleaved in a radial direction across inlet module with the tubes 168 extending between the headers 167', 167" on the radially opposite side 161b. Likewise, the tubes 168 extending between the headers 167', 167" on the side 161c may be interleaved in a radial direction across inlet module 160 with the tubes 168 extending between the headers 167', 167" on the radially opposite side 161d. Further, the tubes 168 extending between the headers 167', 167" on the sides 161a, 161b may be rotated in orientation approximately 90° from the tubes 168 extending between the headers 167', 167" on the sides 161c, 161d.

Each header 167', 167" includes a plurality of caps 166 that may be disconnected (e.g., unthreaded) to expose the interior of the corresponding headers 167', 167" and the tubes 168 coupled to and aligned therewith aligned therewith. Without being limited to this or any other theory, the tubes 168 of the inlet module 160 may be the first place (or one of the first places) in the heat exchanger 150 that the cooking fluid is heated by the combusted air/fuel mixture. Thus, significant build up of residue (e.g., due to the relatively high differences in temperature between the cooking fluid in the tubes 168 and the combusted air/fuel mixture in the air duct 163) may build up within the tubes 168. Thus, the caps 166 may provide ready access to the tubes 168 within the inlet module 160 so that the build up may be more readily cleaned without performing a more substantial deconstruction of the heat exchanger 150. Thus, the access provided by caps 166 may help to shorten maintenance operations, and increase production times between major shutdowns and repair of the heat exchanger 150 (or the cooking system 10 more broadly).

Referring again to FIG. 13, each heat exchanger module 152 includes a plurality of inlets 156, a plurality of outlets 158, and a plurality of headers 154 positioned about the outer perimeter of heat exchanger module 152 and axially positioned between the plurality of inlets 156 and the plurality of outlets 158. The headers 154 positioned along the four rectangular sides of the corresponding heat exchanger module 152 so that each header 154 is radially opposite another of the headers 154 in a similar manner to that described above for headers 104, 108, 116, 120 of heat exchanger 100 (FIGS. 10-12). As with the heat exchanger 100 shown in FIGS. 10-12, a plurality of tubes (tubes 151 shown in FIG. 19) may extend between the headers 154 in a similar manner to that described above for tubes 106, 110, 118, 122 and headers 104, 108, 116, 120. Thus, each heat exchanger module 152 defines a first fluid circuit and a second fluid circuit that extend between the corresponding inlets 156 and outlets 158 in a similar manner to that described above for first fluid circuit 101 and the second fluid circuit 113 in heat exchanger 100.

An access panel 159 may be mounted on one or more of the headers 154. For instance, access panel 159 may be positioned on a header 154 that is proximate to the inlets 156 along the fluid circuits defined within heat exchanger module 152. More specifically, panel 159 may be positioned on headers 154 that are immediately downstream of headers 154 that include the inlets 156 along the first and second fluid circuits within heat exchanger module 152. During operations, the access panel 159 may be uncoupled (e.g., unbolted) from the header 154 to reveal the tubes (not shown) fluidly coupled thereto.

The inlet module 160, heat exchanger modules 152, and outlet nozzle 153 are all coupled to one another via mounting flanges 157. In addition, the outlets 164 of inlet module 160 are fluidly coupled to the inlets 156 of the axially adjacent heat exchanger module 152, and the inlets 156 of each heat exchanger module 152 are fluidly coupled to either the outlets 158 of another heat exchanger module 152 (e.g., an axially adjacent heat exchanger module 152) or the outlets 164 of the inlet module 160. The outlets 158 of the heat exchanger module 152 that are most proximate the upper end 150a (e.g., the heat exchanger module 152 that is immediately axially adjacent the outlet nozzle 153) may comprise an outlet for cooking fluid from the heat exchanger 150 during operations. The conduits (e.g., host, pipes, tubing, etc.) that couple the outlets 164, 158 and inlets 156 as described above is not shown in FIG. 13 so as to better show the structure of heat exchanger 150.

A central fluid duct 163 (or more simply "fluid duct 163") extends between the ends 150a, 150b. The tubes (not shown) extending between (e.g., radially between) the headers 167 of inlet module 160 and the tubes (not shown) extending between (e.g., radially between) the headers 154 of heat exchanger modules 152 may extend across the fluid duct 163 in a similar manner to that described above for the tubes 106, 110, 118, 122 extending across fluid ducts 128 within heat exchanger 100 (FIGS. 10-12). Thus, the fluid duct 163 is fluidly separated and isolated from the plurality of headers 167 and tubes (not shown) of inlet module 160 and from the plurality of headers 154 and tubes (not shown) of heat exchanger module 152.

During operations, combusted fuel and/or combusted air/fuel mixture is emitted from a burner or burners (e.g., burners 70 or burner assembly 50 or burner assembly 90) and is flowed through the central fluid duct 163 from the lower end 150b and out of the outlet nozzle 153 at upper end 150a. Simultaneously, cooking fluid is circulated through the heat exchanger 150 so as to facilitate a transfer of heat from the combusted fuel and/or combusted air/fuel mixture to the cooking fluid. Specifically, cooking fluid is provided or flowed into the inlets 162 of inlet module 160. From there, the cooking fluid is flowed through the tubes (not shown) of inlet module 160 to the outlets 164 via the headers 167 as previously described above. The cooking fluid is then communicated from the outlets 164 of inlet module 160 to the inlets 156 of the immediately axially adjacent heat exchanger module 152. Thereafter, the cooking fluid is circulated through the first and second fluid circuits (not shown) of each heat exchanger module 152 (wherein the cooking fluid is communicated from the outlets 158 of one heat exchanger module 152 to the inlets 156 of an axially adjacent heat exchanger module 152). Eventually, the cooking fluid is emitted from the heat exchanger 150 via the outlets 158 of the heat exchanger module 152 that is most proximate the upper end 150a (and outlet nozzle 153). As the cooking fluid flows through the tubes (not shown) extending between the headers 167 of the inlet module 160 and the tubes (not shown) extending between the headers 154 of the heat exchanger modules 152, the combusted fuel and/or combusted air/fuel mixture flowed around the outer surface of the tubes (not shown) within inlet module 160 and heat exchanger modules 152 along fluid duct 163 so that the temperature of the cooking fluid is increased as it flows from the inlets 162 of inlet module 160 to the outlets 158 of the last heat exchanger module 152 (e.g., or the outlets 158 of the heat exchanger module 152 that is most axially proximate to the upper end 150a and outlet nozzle 153).

During these operations, a highest rate of temperature transfer from the combusted fuel and/or combusted air/fuel mixture to the cooking fluid may occur within the initial headers (e.g., headers 167, 154) and tubes (not shown) that are downstream from a fluid inlet (e.g., inlets 162, 156). Without being limited to this or any other theory, the higher rate of heat transfer may lead to a buildup of residue or other solids in these portions of the heat exchanger 150. Thus, the placement of caps 166 and access panels 159 may facilitate cleaning and maintenance (e.g., including replacement of tubes therein) of these portions of heat exchanger 150 after a period of operation. In addition, because the heat exchanger 150 comprises a plurality of modules 160, 152 coupled end-to-end via mounting flanges 157, if a module or modules of the heat exchanger 150 should become damaged, clogged or otherwise unusable, the particular module or modules may be uncoupled and/or replaced within the heat exchanger 150 so that operations may be restarted relatively quickly. Accordingly, heat exchanger 150 is configured to be readily cleaned and maintained so that periods of non-operation (e.g., for repair, cleaning, or maintenance) may be relatively short, thus allowing cooking system 10 (FIG. 1) to operate for longer periods of time.

Figure 15:
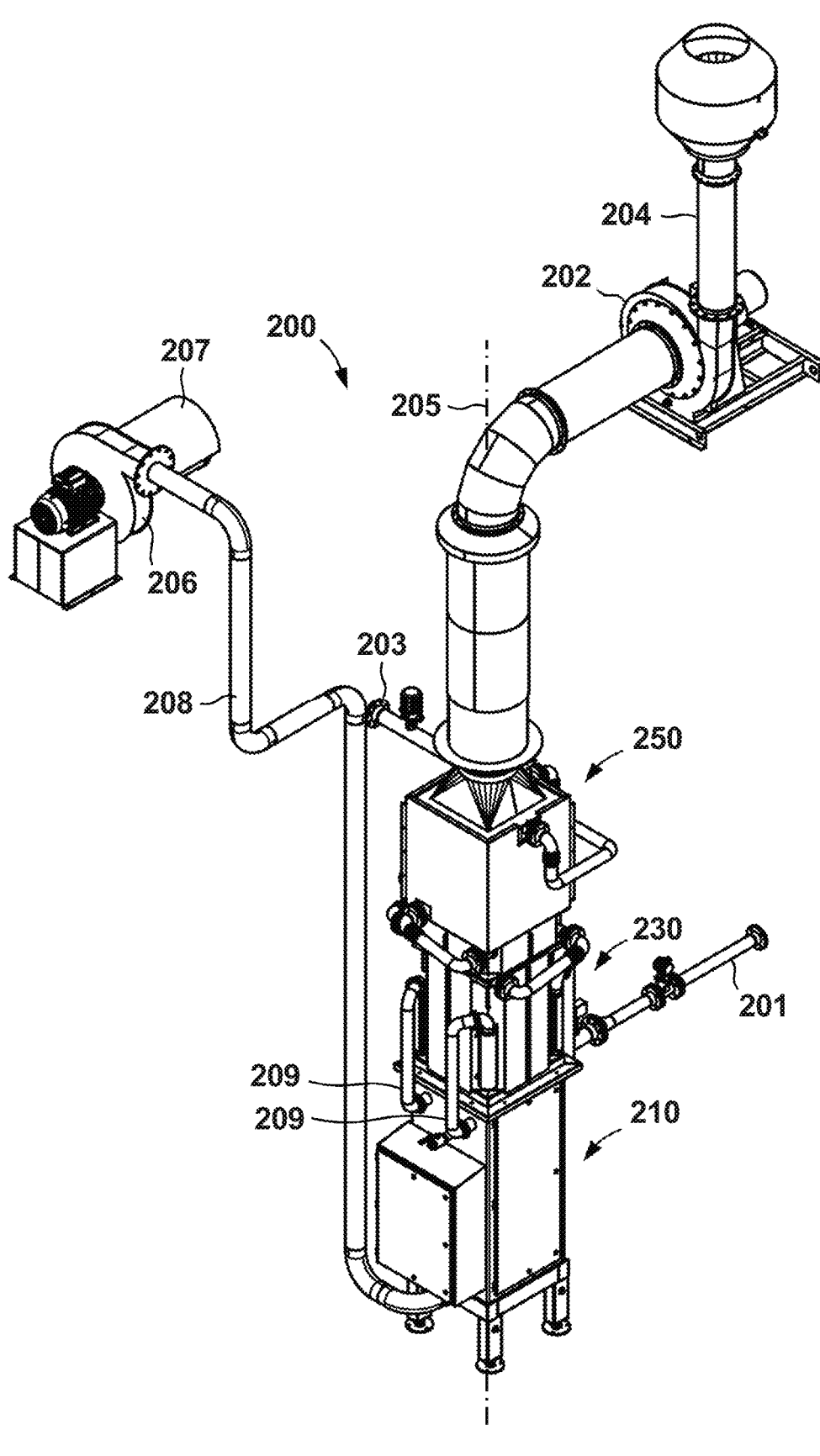
FIG. 15 is a perspective view of a heat exchanger that may be used within the cooking system of FIG. 1 according to some embodiments.

Referring now to FIG. 15, a perspective view of heat exchanger 200 that may be used within cooking system 10 of FIG. 1 according to some embodiments is shown. Referring briefly again to FIG. 1 in some embodiments, the heat exchanger(s) 200 may receive (and further heat) a flow of cooking fluid 14 from the heat exchanger 100. Alternatively, in some embodiments heat exchanger(s) 200 may receive and heat a flow of cooking fluid that is provided directly from cooking vessel 300 (or filter assembly 400) and/or reservoir 12.

Generally speaking, heat exchanger 200 includes an air/fuel mixing assembly 210, a pre-heating assembly 230, and heat exchanger assembly 250. The air/fuel mixing assembly 210, pre-heating assembly 230, and heat exchanger assembly 250 may be stacked atop one another along a central or longitudinal axis 205.

During operations, cooking fluid is provided to the pre-heating assembly 230 via an inlet line 201. Thereafter, the cooking fluid is heated within the heat exchanger 200 (particularly within the pre-heating assembly 230 and heat exchanger assembly 250), and then is emitted from heat exchanger 200 (particularly from heat exchanger assembly 250) via an outlet line 203. In addition, during operations, air and fuel are received by and mixed within the air/fuel mixing assembly 210 via a plurality of pipes of conduits 209. Thereafter, the air/fuel mixture is combusted in the pre-heating assembly 230, and the hot combusted air/fuel mixture is then flowed through the heat exchanger assembly 250 to an exhaust flue 204. A pump 206 may draw in air via an intake 207 and then flow the air toward the air/fuel mixing assembly 210 via air line 208. In addition, the combusted air/fuel mixture is drawn (or pulled) through the pre-heating assembly 210 and heat exchanger assembly 250 and flowed into the flue 204 via a pump 202. Further details of the pre-heating assembly 230 and heat exchanger assembly 250 are provided below.

Figure 16:
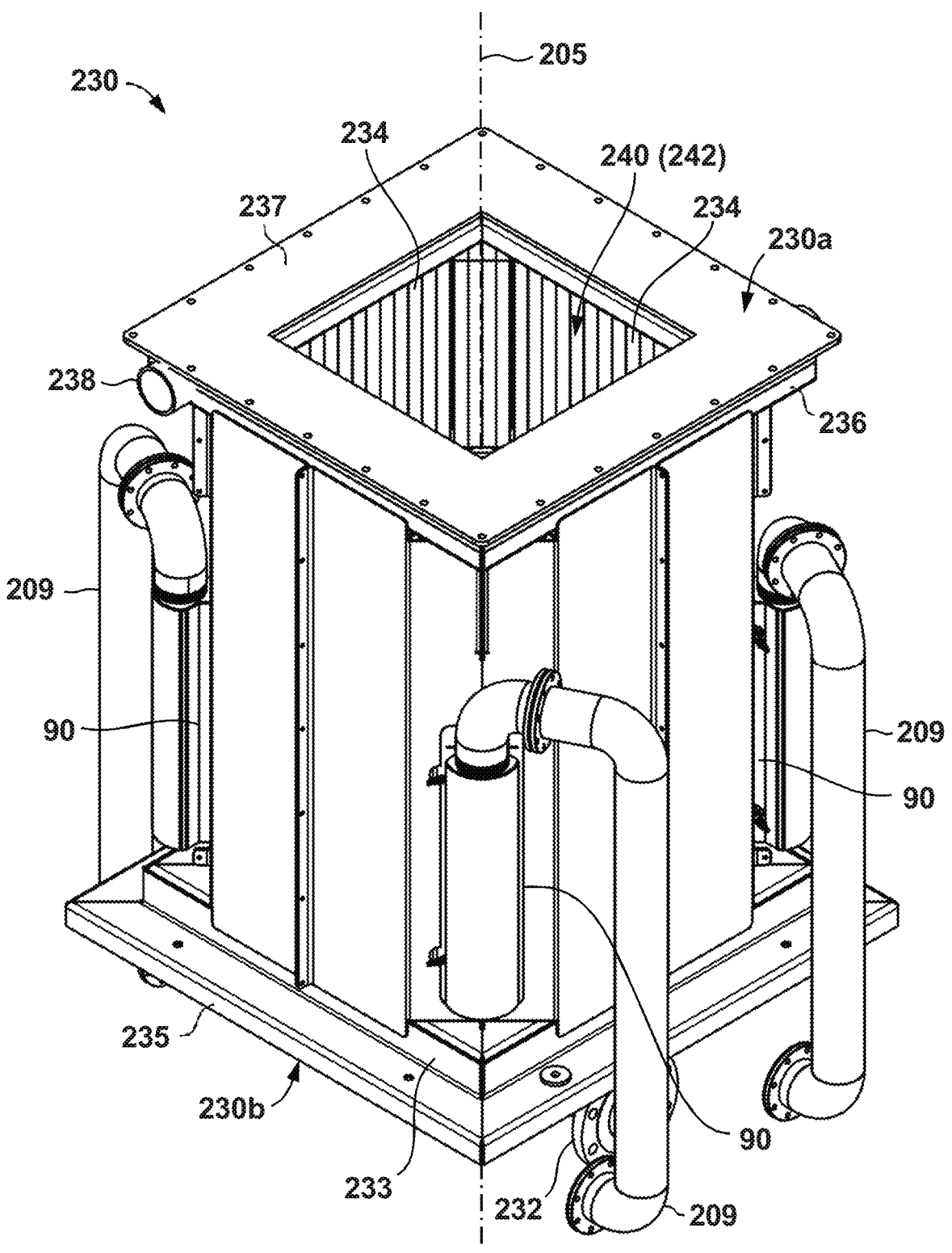
FIG. 16 is a perspective view of a pre-heating assembly of the heat exchanger of FIG. 15 according to some embodiments.
Figure 17:
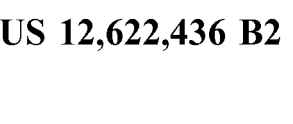
FIG. 17 is a side, cross-sectional view of the pre-heating assembly of FIG. 16 according to some embodiments.

Referring to FIGS. 16 and 17, preheater or pre-heating assembly 230 includes a first end 230a, and a second end 230b opposite first end 230a. In some embodiments, the axis 205 of heat exchanger 200 is in a vertical orientation such as is shown in FIG. 15. As a result, the first end 230a may be referred to herein as an "upper end" 230a and the second end 230b may be referred to herein as a "lower end" 230b. However, it should be appreciated that axis 205 of heat exchanger 200 may be arranged in other orientations (e.g., such as a horizontal orientation), so the use of the terms "upper end" and "lower end" with reference to ends 230a and 230b, respectively, it not intended to limit all possible embodiments of heat exchanger 200 or pre-heating assembly 230.

A first or upper mounting flange 237 may be positioned at the upper end 230a and a second or lower mounting flange 235 may be positioned at lower end 230b. The lower mounting flange 235 may be used to couple the pre-heating assembly 230 to the air/fuel mixing assembly 210 (FIG. 15), and the upper flange 237 may be used to couple the pre-heating assembly 230 to the heat exchanger assembly 250 (FIG. 15).

A cooking fluid inlet 232 is coupled to an inlet manifold 233 that is positioned at (or proximate to) the lower end 230b. In addition, an outlet manifold 236 is positioned at (or proximate to) the upper end 230a that is coupled to a cooking fluid outlet 238. A plurality of tubes 234 are arranged about the axis 205 that extend axially (e.g., with respect to axis 205) from the inlet manifold 233 to the outlet manifold 236. Accordingly, the inlet manifold 233 is in fluid communication with the outlet manifold 236 via the plurality of tubes 234.

A central flow path 240 is defined within pre-heating assembly 230 that extends axially between ends 230a, 230b and that is radially positioned (with respect to axis 205) within the plurality of tubes 234. Thus, the plurality of tubes 234 may be arranged about a radially outer perimeter of the central flow path 240 (or the fluid duct 242 as described in more detail below). In addition, the inlet manifold 233 and the outlet manifold 236 may extend annularly or circumferentially about the central flow path 240 (or fluid duct 242). A plurality of burner assemblies 90 are arranged angularly about the axis 205 and central flow path 240. In particular, in some embodiments, the pre-heating assembly 230 is generally rectangular in cross-section, and each of the plurality of burner assemblies 90 are positioned at a different corner defined along the cross-section. Thus, in some embodiments, there are a total of four burner assemblies 90 included on pre-heating assembly 230. Each burner assembly 90 receives air/fuel mixture via a corresponding one of the conduits 209. The burner assemblies 90 may each be configured in the manner previously described above (FIGS. 8 and 9). However, generally speaking, burner assemblies 90 may each include a plurality of burners 70 that communicate with the central flow path 240.

During operations, cooking fluid is provided to the inlet manifold 233 via the inlet 232. Thereafter, the cooking fluid is directed axially along the plurality of tubes 234 to the outlet manifold 236 and its emitted from the pre-heating assembly 230 via the outlet 238. Simultaneously, air/fuel mixture is communicated to the burner assemblies 90 via the conduits 209. The air/fuel mixture is then combusted within the burners 70 of the burner assemblies 90 and the combusted air/fuel mixture is then emitted radially into the central flow path 240. After entering the central flow path 240 via the burners 70 of burner assemblies 90, the combusted air/fuel mixture then flows axially along the central flow path 240 toward the upper end 230a.

As the combusted air/fuel mixture flows along central flow path 240 to upper end 230a, the heat of the combusted air/fuel mixture is transferred through the tubes 234 to the cooking fluid flowing therein. As a result, the cooking fluid is heated as it flows along tubes 234 to the outlet manifold 236. Accordingly, the temperature of the cooking fluid in the outlet manifold 236 is higher than in the inlet manifold 233.

In one embodiment, the pre-heating assembly 230 is used to heat cooking fluid and provide heat to the heat exchanger manifold assembly 250, as further discussed below, in place of the thermal oxidizer 40. In other embodiments, the pre-heating assembly 230 may be used in combination with the thermal oxidizer 40. In still other embodiments, the pre-heating assembly 230 may be omitted in implementations that employ the thermal oxidizer 40.

Figure 18:
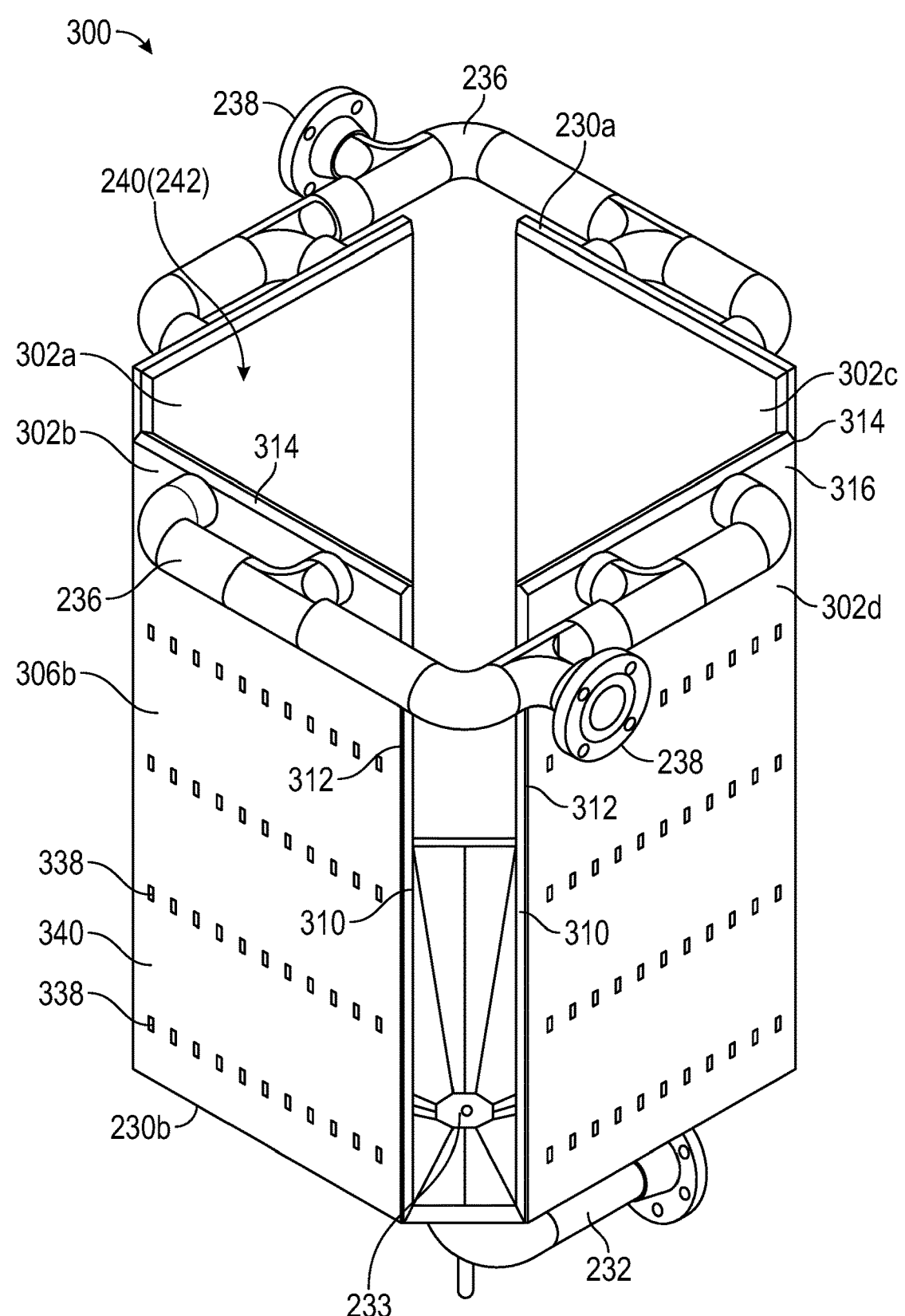
FIG. 18 is a perspective view of a combustion chamber according to some embodiments.

Referring to FIG. 18, another embodiment of the pre-heating assembly 230, referred to in this embodiment as a pre-heating or combustion chamber 300 for clarity of description, is illustrated. The combustion chamber 300 is similar in some respects to the pre-heating assembly 230 and may include any combination of the features described with regard to the pre-heating assembly 230. Thus, components that are generally similar may be similarly identified. For example, as described in FIGS. 16 and 17, the combustion chamber 300 may also include components such as the first or upper mounting flange 237 positioned at the upper end 230a and the second or lower mounting flange 235 positioned at lower end 230b. The lower mounting flange 235 may be used to couple the combustion chamber 300 to the air/fuel mixing assembly 210 (FIG. 15), and the upper flange 237 may be used to couple the combustion chamber 300 to the heat exchanger assembly 250 (FIG. 15). Similarly, the combustion chamber 300 may include the cooking fluid inlet 232 coupled to an inlet manifold 233 positioned at (or proximate to) the lower end 230b. In addition, the outlet manifold 236 may be positioned at (or proximate to) the upper end 230a that is coupled to the cooking fluid outlet 238. Similarly, features of the combustion chamber 300 may be variously employed into the pre-heating assembly 230. These and other combinations of features may be used in the present embodiment and will not be further described for sake of brevity as such combinations will readily suggest themselves to one skilled in the art, all of which are within the spirit and scope of the present disclosure.

The combustion chamber 300 includes a number of notable differences from the pre-heating assembly 230. For example, while the pre-heating assembly 230 includes a plurality of tubes 234 that extend axially (e.g., with respect to axis 205) from the inlet manifold 233 to the outlet manifold 236, the combustion chamber 300 is instead provided with a plurality of hollow walls 302a-302d. As will be discussed below, the hollow walls 302a-302d are not completely 'hollow' and the term 'hollow' is used herein merely as a general description. While four (4) walls are shown, other configurations including fewer or more walls or wall shapes defining the combustion chamber 300 are anticipated. In this embodiment, the central flow path 240 is defined within combustion chamber 300 that extends axially between ends 230a, 230b and that is radially positioned (with respect to axis 205) within the plurality of hollow walls 302a-302d. Thus, the plurality of hollow walls 302a-302d may be arranged about a radially outer perimeter of the central flow path 240. In addition, the inlet manifold 233 and the outlet manifold 236 may extend annularly or circumferentially about the central flow path 240 (or fluid duct 242).

Figure 19:
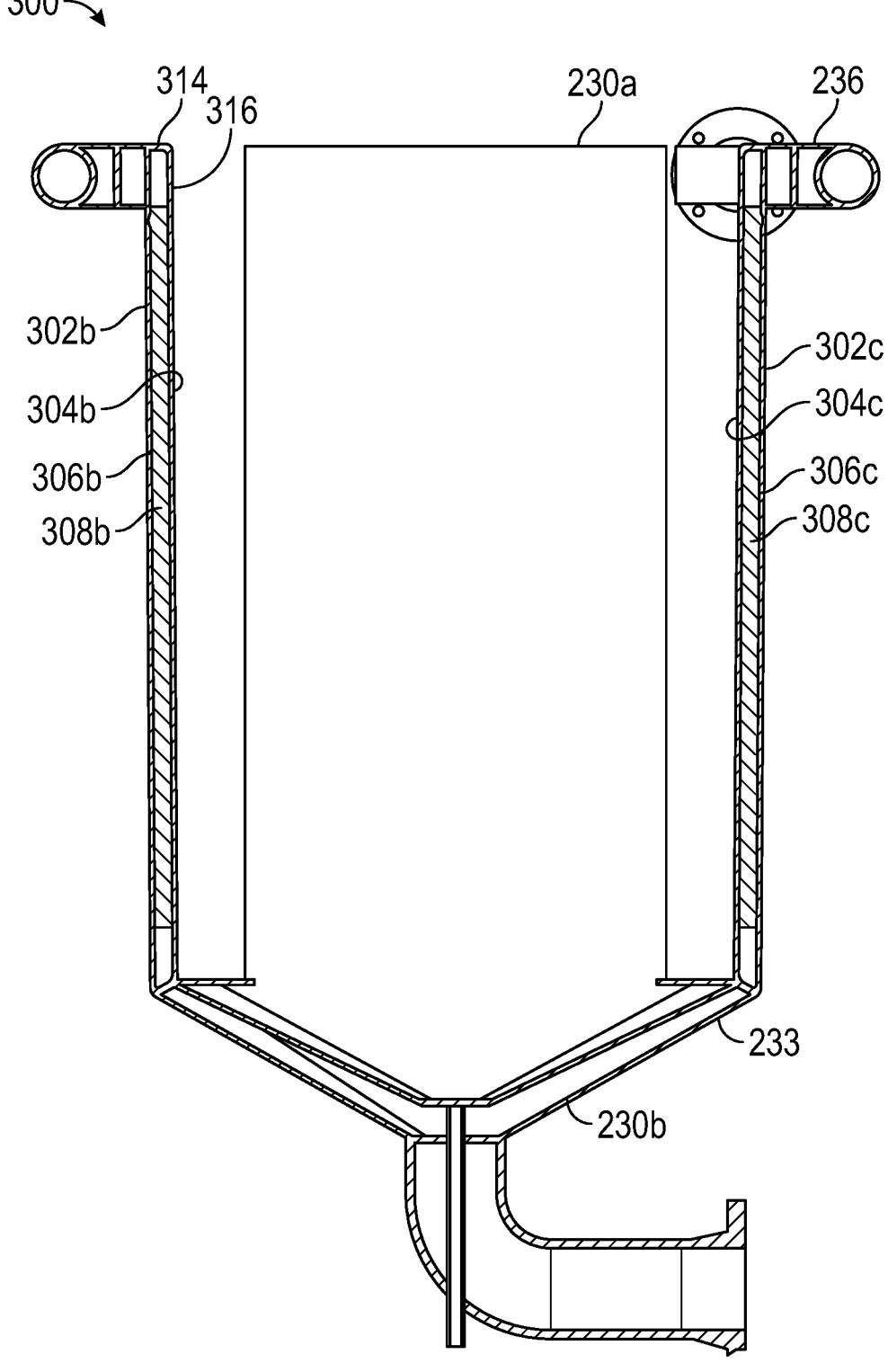
FIG. 19 is a cross-sectional view of the combustion chamber of FIG. 18 according to some embodiments.

Referring to FIG. 19, a side cut-away view of the combustion chamber 300 is shown. As can be seen, the hollow walls 302b, 302c each include an inner wall 304b, 304c, generally referred to as inner wall 304, and an outer wall 306b, 306c, generally referred to as outer wall 306. The inner and outer walls 304 and 306 are spaced apart and define an interior passageway 308b, 308c, generally referred to as interior passageway 308, therebetween. Referring also to FIG. 18, side panels 310 are located along sides 312 of the inner and outer walls 304, 306 and enclose inner and outer walls 304, 306 along the sides 312. The inner and outer walls 304, 306 are connected near the lower end 230b to the inlet manifold 233 and at the upper end 230a near the outlet manifold 236. In this manner, the interior passageway 308 is in fluid communication with the inlet and outlet manifolds 233, 236. In this embodiment, the outlet manifolds 236 are connected to the outer wall 306 near the upper end 230a, and in such case, a top panel 314 may be connected along an upper end 316 of the hollow wall 302 between inner and outer walls 304, 306 to enclose the upper end 316 of the hollow wall 302.

Figure 20:
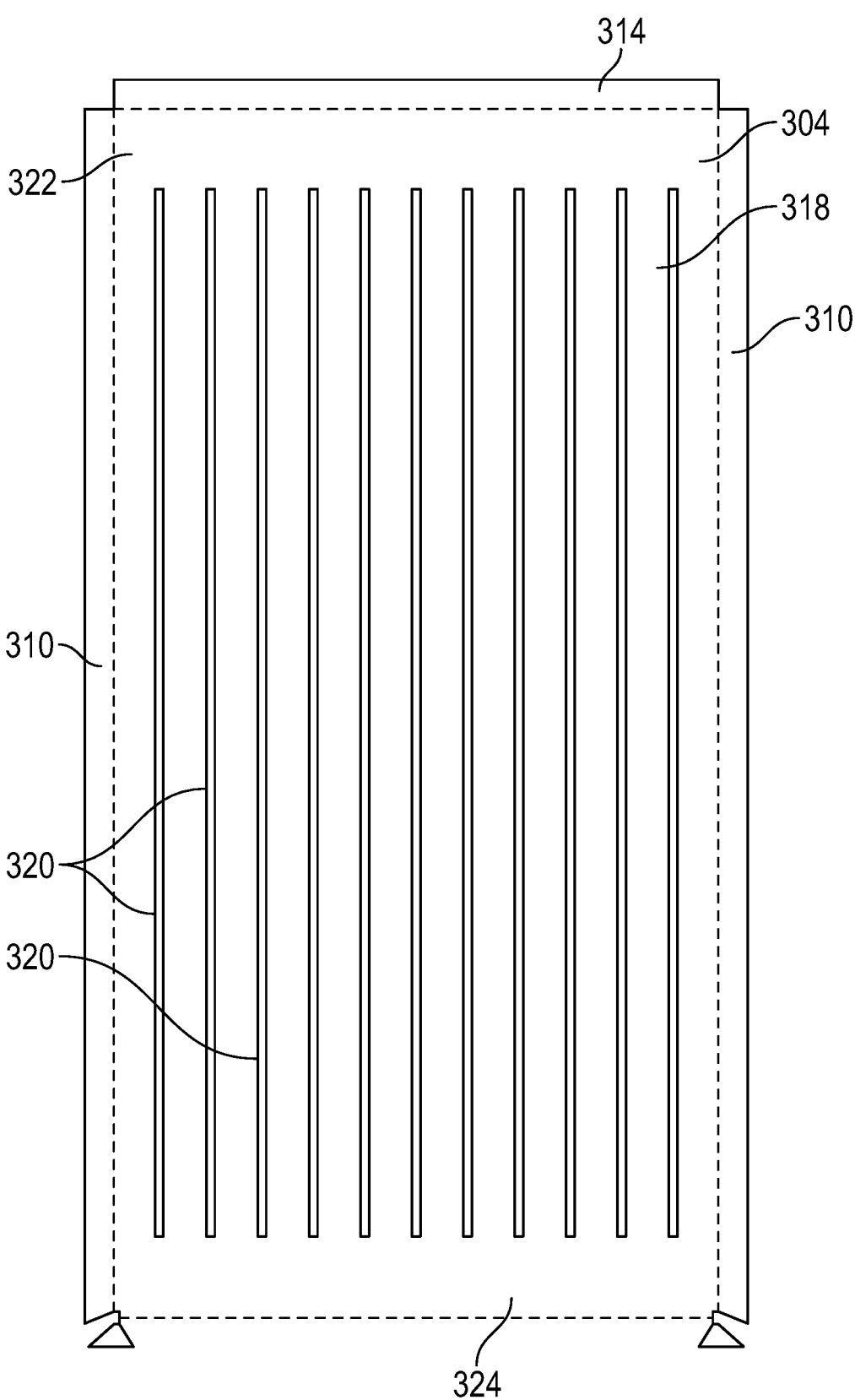
FIG. 20 is a side view of an inner wall of the combustion chamber of FIG. 18 according to some embodiments.

FIG. 20 is side view of an interior face 318 of the inner wall 304. As can be seen, a plurality of ribs 320 are provided on the interior face 318 and extend longitudinally between an upper end 322 and a lower end 324 on the interior face 318 of the inner wall 304. Referring also to FIG. 21, a perspective view of one of the ribs 320 is shown. The rib 320 is generally a longitudinal member having substantially flat left, right, and back surfaces 326, 328, 330, respectively. A front surface 332 of the rib 320 is provided with a plurality of notches 334. The rib 320 has a depth or distance 335 defined between the back surface 330 and the front surface 332 of the rib 320. The back surface 330 of the rib 320 is mounted to the interior face 318 of the inner wall 304, as shown in FIG. 20. Although the ribs 320 are mounted to the interior face 318 of the inner wall 304 in this embodiment, other attachment or placement of the ribs 320 is contemplated herein that achieves positioning of the ribs 320 in the interior passageway 308.

Figure 22:
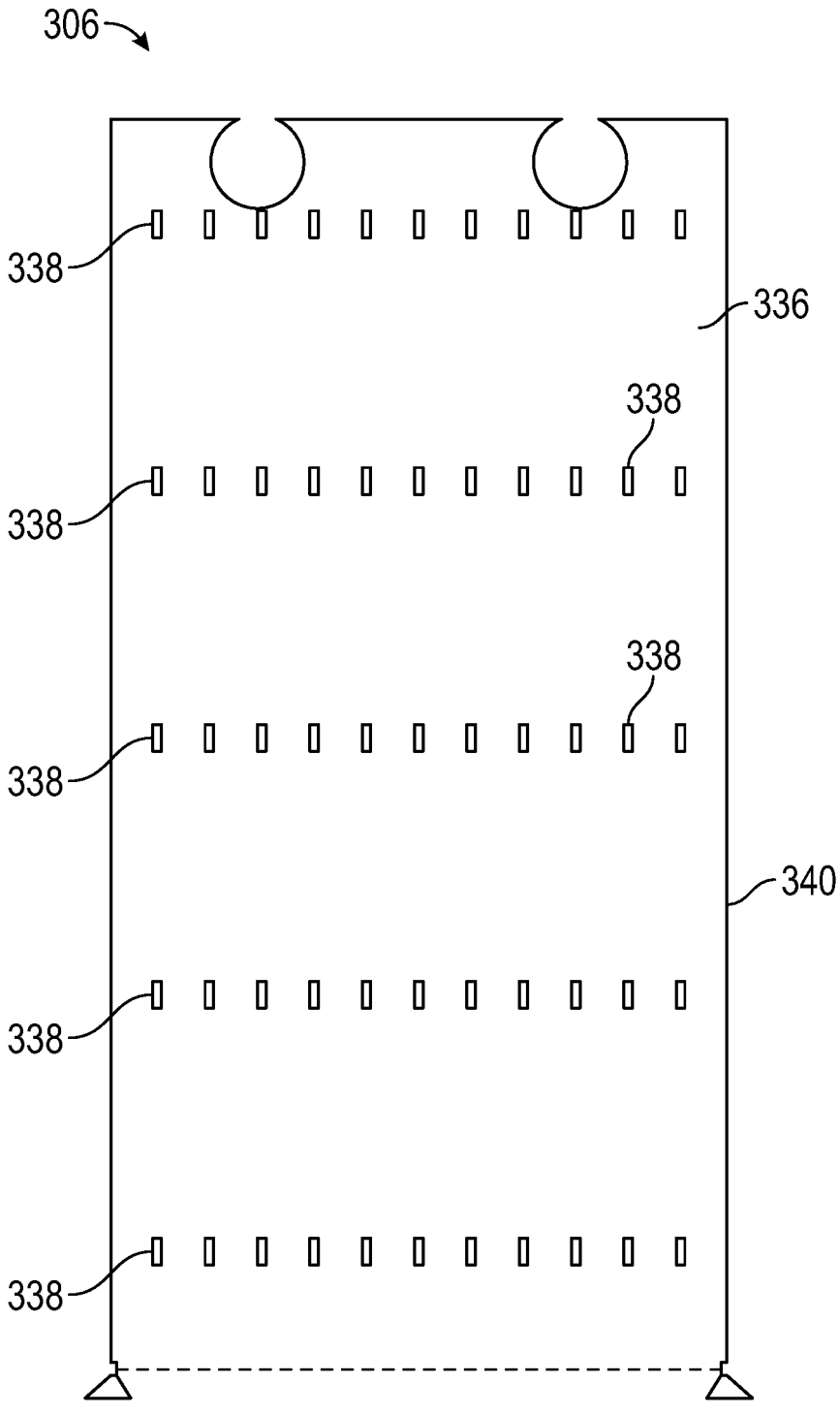
FIG. 22 is a cross-sectional view of an outer wall of the combustion chamber of FIG. 18 according to some embodiments.

Referring also to FIG. 22, a side view of an interior face 336 of the outer wall 306 is illustrated. The outer wall 306 is provided with a plurality of holes or openings 338 that extend through the interior face 336 to an exterior face 340 of the outer wall 306. When the ribs 320 are mounted to the interior face 318 of the inner wall 304, as shown in FIG. 20, the interior face 336 of the outer wall 306 may be attached such that the notches 334 in the ribs 320 align with the openings 338 in the outer wall 306. The depth or distance 335 between the back surface 330 and the front surface 332 of the rib 320 creates the interior passageway 308 between the inner and outer walls 304, 306.

The combustion chamber 300 is provided with four (4) burner assemblies 90 (not shown) located between adjacent walls 302, similar to that described with respect to pre-heating assembly 230. Further the inlet manifold 233 is attached and in fluid communication with the walls 302.

In operation, heat is provided to the combustion chamber 300 via the burner assemblies 90. Fluid, such as cooking fluid, is provided to the combustion chamber 300 via the inlet manifold 233 which distributes the fluid to the hollow walls 302a-302d. The fluid flows through the interior passageway 308 and is diverted or channeled by the ribs 320 in the interior passageway 308 and travels from adjacent the lower end 230b to adjacent the upper end 230a. The fluid then exits the combustion chamber 300 via the outlet manifold 236.

Although eleven (11) ribs 320 are illustrated in the embodiment shown in FIG. 20, in other embodiments more or fewer ribs 320 with more or fewer notches 334 may be provided. Accordingly, the interior face 336 of the outer wall 306 would be provided with a corresponding number and location of openings 338.

Figures 23A, 23B:
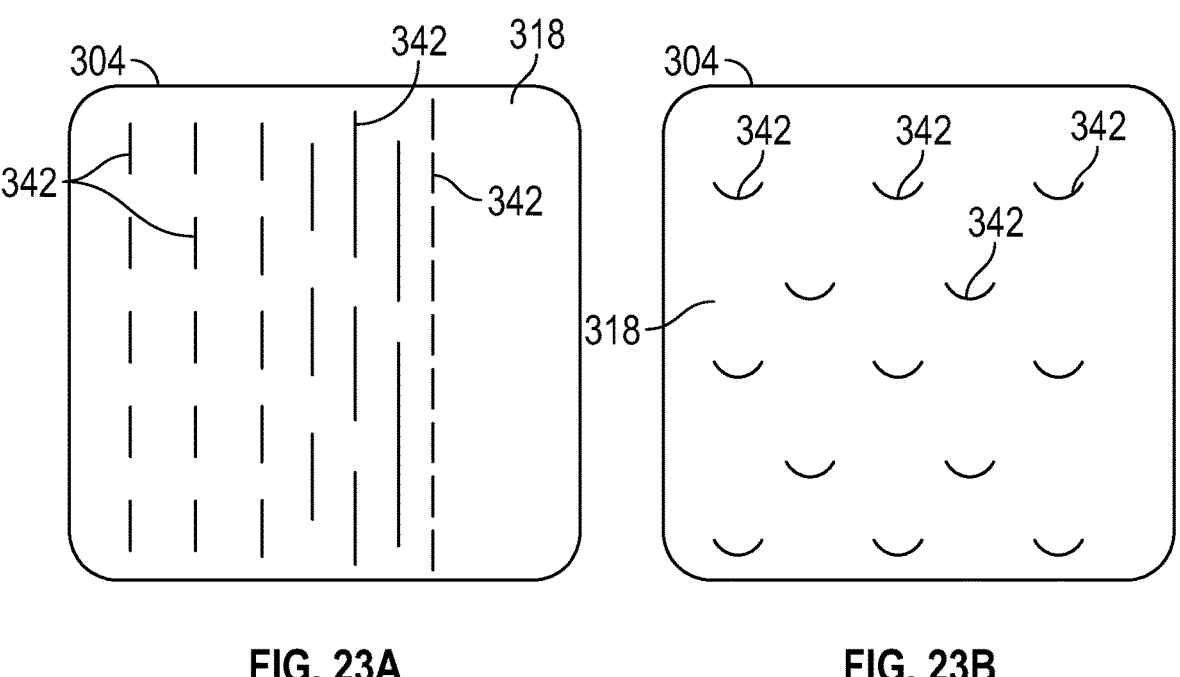
FIGS. 23A-23B illustrate guide configurations of the combustion chamber of FIG. 18 according to some embodiments.
Figures 23C, 23D:
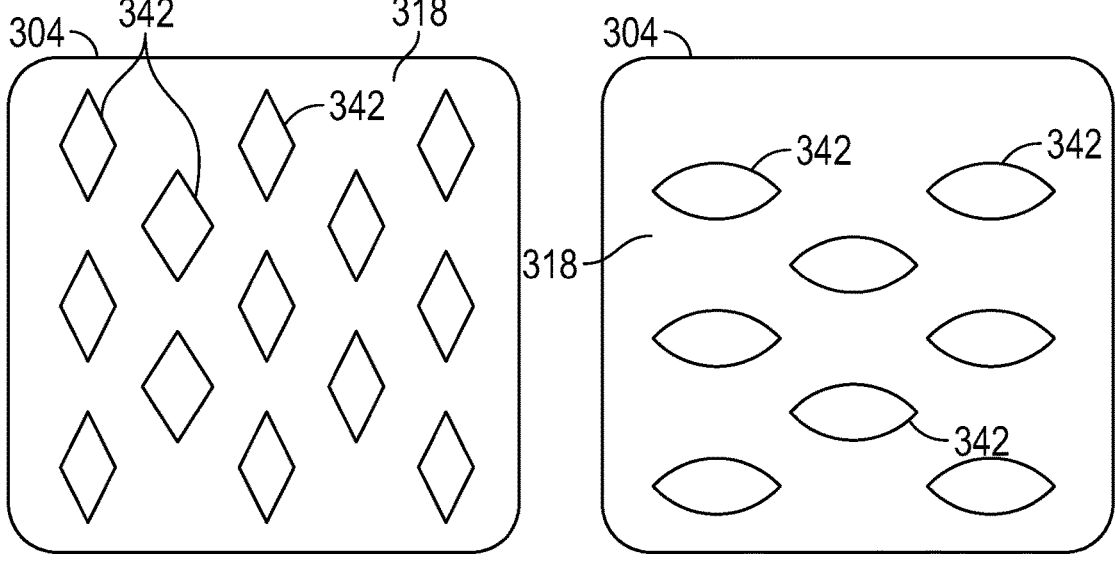

Referring to FIGS. 23A-23D, a wide range of configurations of the guides 342, such as the ribs 320, are anticipated by the present disclosure. For example, as shown in FIG. 23A, the guides 342 may be similar to the ribs 320, in that they are generally longitudinal, but may be shorter or longer, of greater width, provided intermittently or staggered and so on. FIG. 23B illustrates another embodiment of the guides 342. In this embodiment, the guides 342 are semi-circular and staggered along the interior face 318 of the inner wall 304. In the embodiment shown in FIG. 23C the guides 342 are diamond or rhombus shaped, while the embodiment shown in FIG. 23D illustrates guides 342 that are elliptical.

These and other configurations or shapes of the guides 342, the numbers and locations of the guides, and so on, located in the interior passageway 308 are anticipated that promote the uniform distribution and heat transfer of fluid are within the spirit and scope of the present disclosure.

In practice, it has been noted that the present embodiment may provide more robust and straightforward construction and longevity over tubes, and similar or improved heat transfer to the fluid passing the interior passageway 308. Further, the ribs 320 act to provide even distribution of fluid flowing through the interior passageway 308 and prevent the fluid from forming pockets of uneven flow or circulation of the fluid through the interior passageway 308. Thus, the present embodiment may provide more uniform fluid flow and heat transfer.

Although not shown, the inlet manifold 233 and walls 302 may be formed to make-up the corners or edges of the combustion chamber 300 and the burner assemblies 90 may then be placed in gaps between the walls 302 formed, for example in the middle along the lengthwise sides, instead of on the corners of the combustion chamber 300. Also, each wall 302 may constructed as a two or more sub-walls that connect to form the wall 302 or otherwise configured. The components described herein may constructed of various materials such as metallic or other materials and coupled or connect via welding or using other well-known techniques. Although the construction and attachment of the various components may be described for ease of understanding, other orders of assembly or attachment may be used and are within the spirit and scope of the present disclosure.

Figure 24:
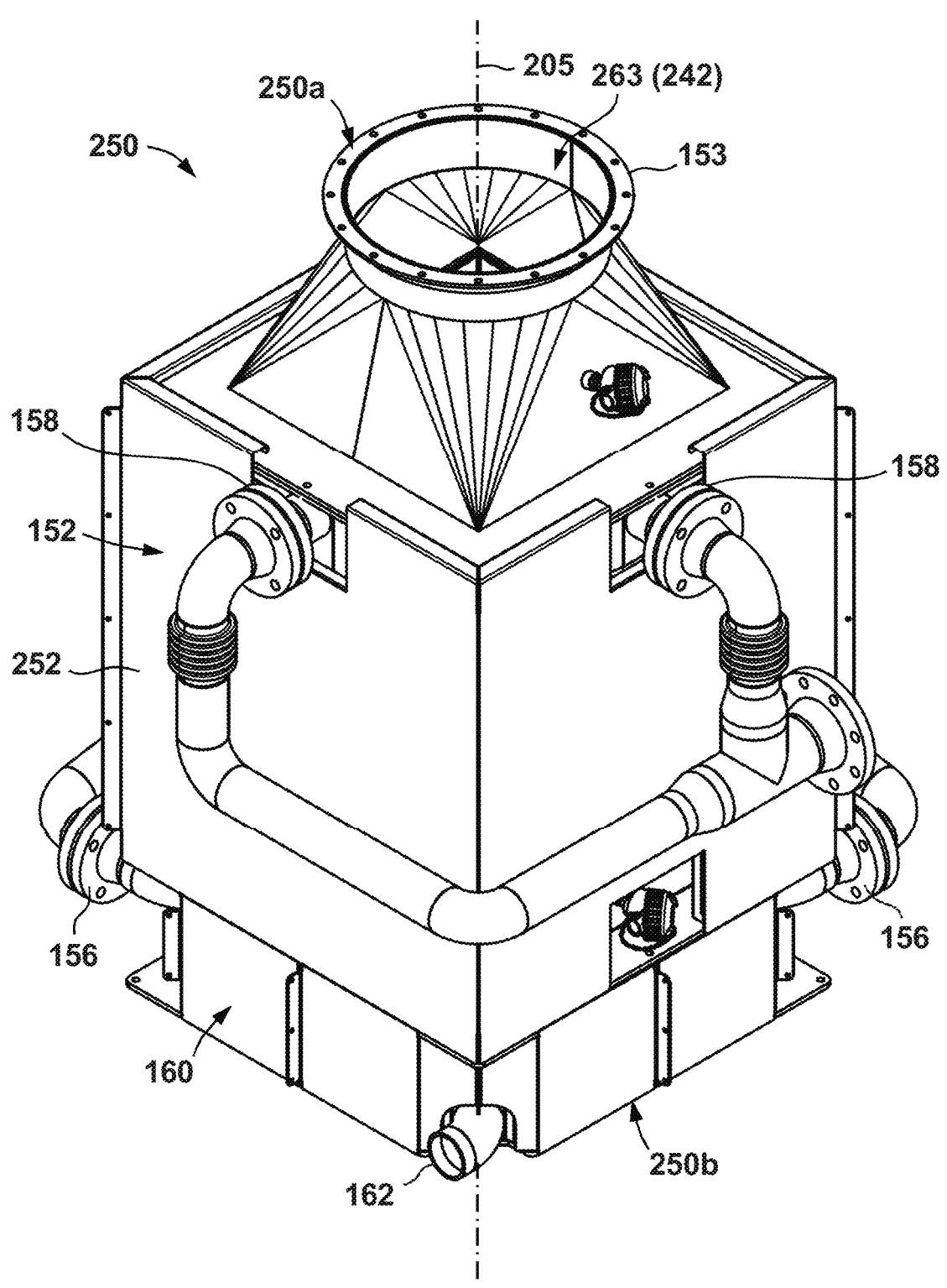
FIG. 24 is a perspective view of a heat exchanger assembly of the heat exchanger of FIG. 16 according to some embodiments.
Figure 25:
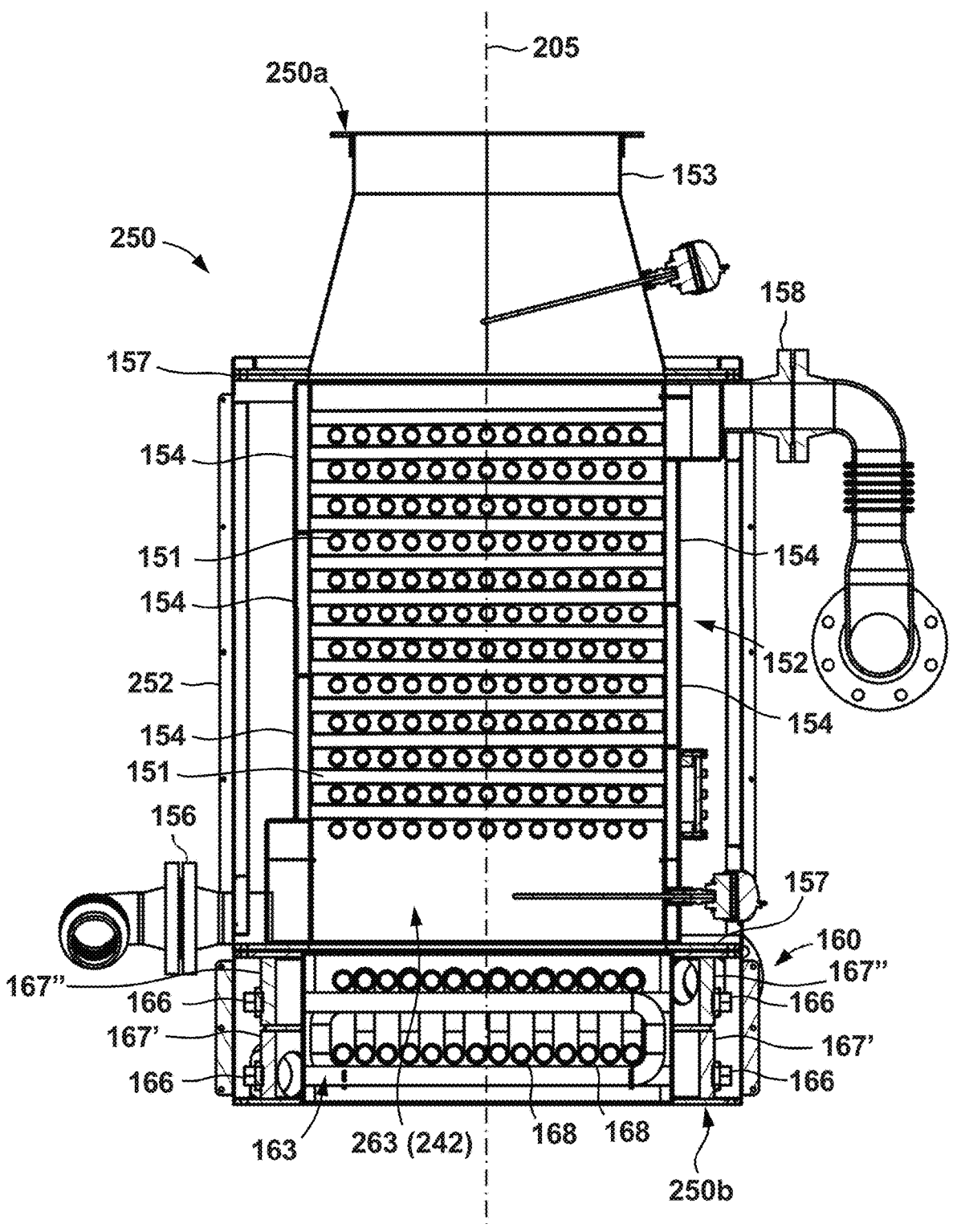
FIG. 25 is a side, cross-sectional view of the heat exchanger assembly of FIG. 24 according to some embodiments.

Referring now to FIGS. 24 and 25, heat exchanger assembly 250 includes a first end 250a, and a second end 250b opposite first end 250a. In some embodiments, the axis 205 of heat exchanger 200 is in a vertical orientation such as is shown in FIG. 15. As a result, the first end 250a may be referred to herein as an "upper end" 250a and the second end 250b may be referred to herein as a "lower end" 250b. However, it should be appreciated that axis 205 of heat exchanger 200 may be arranged in other orientations (e.g., such as a horizontal orientation), so the use of the terms "upper end" and "lower end" with reference to ends 250a and 250b, respectively, is not intended to limit all possible embodiments of heat exchanger 200 or heat exchanger assembly 250.

Heat exchanger assembly 250 includes an inlet module 160 at the lower end 250b, an outlet nozzle 153 at the upper end 250a, and a heat exchanger module 152 positioned axially between the inlet module 160 and outlet nozzle 153. In some embodiments, heat exchanger assembly 250 includes a plurality of heat exchanger modules 152 stacked axially between inlet module 160 and outlet nozzle 153. The inlet module 160, heat exchanger module 152, and outlet nozzle 153 are substantially the same as the similarly named and numbered components of the heat exchanger 200. Thus, a detailed description of these components within the heat exchanger assembly 250 is omitted for purposes of brevity. An outer housing or shield 252 is positioned about the heat exchanger module 152 and inlet module 160 to provide additional protection to these components and/or to prevent personnel from contacting the potentially hot outer surfaces of the inlet module 160 and heat exchanger module 152 during operations.

As best shown in FIG. 25, a central flow path 263 extends axially through the inlet module 160, heat exchanger module 152, and outlet nozzle 153. The central flow path 263 may be in fluid communication with central flow path 240 in pre-heating assembly 230. Together, the central flow paths 240, 263 may form or define a fluid duct 242 that extends axially through heat exchanger 200 (particularly through pre-heating assembly 230, inlet module 160, heat exchanger module 152, and outlet nozzle 153) with respect to axis 205. Thus, during operations combusted air/fuel mixture is flowed along the fluid duct 242 from pre-heating assembly 230 and then axially through the heat exchanger assembly 250 from lower end 250b to upper end 250a via the central flow path 263. As the combusted air/fuel mixture flows along central flow path 263 it flows between and around the tubes 168, 151 within the inlet module 160 and heat exchanger module 152 so that heat is transferred from the combusted air/fuel mixture to cooking fluid that is flowing through the tubes 168, 151 as previously described. Referring briefly to FIGS. 17 and 25, as previously described, the plurality of tubes 234 are arranged about a radially outer perimeter of the fluid duct 242 (within pre-heating assembly 230), and the plurality of tubes 151, 168 extend radially across the fluid duct 242 (within the heat exchanger assembly 250).

Referring back now to FIG. 15, after the combusted air/fuel mixture exits heat exchanger assembly 250 via outlet nozzle 153, the combusted air/fuel mixture is then drawn into and through flue 204 via pump 202. Flue 204 may vent to atmosphere or another process or system (e.g., exhaust processing system, carbon capture system, etc.).

Because the heat exchanger assembly 250 includes the heat exchanger module 152 and inlet module 160, cleaning, repair, and maintenance operations may be greatly simplified for the heat exchanger 200. For instance, the caps 166 and access panels 159 provide access to heat exchanger assembly 250 for cleaning and/or maintenance operations, and the mounting flanges 157, 237 may allow for the removal and replacement of individual components of heat exchanger 200.

In some embodiments, the heat exchangers described herein, such as heat exchangers 100, 150, 200, and 250 may be configured with pipes, tubes, conduits, an/or headers so as to minimize the total volume of oil in the cooking system 10. For example, by minimizing the diameter and length of such pipes, tubes, conduits, and/or headers reduces the total volume of cooking oil used by the entirety of the cooking system 10, which has advantages, as previously discussed. For example, in one embodiment, where the cooking system 10 is configured for a cooking line with a capacity of about 4,000 pounds per hour of food, such as corn chips, the heat exchanger, such as any of heat exchangers 100, 150, 200, and 250 may be sized to about 60 gallons per minute capacity of cooking oil, which may be significantly smaller than typical systems and reduces the overall volume of cooking oil in the system. The reduced size may be due to the use of smaller diameter pipework while still achieving sufficient heat transfer to heat the cooking oil due to the disclosed design of heat exchangers 100, 150, 200, and 250. In other embodiments, such as where the cooking line capacity of the cooking system 10 is configured for a capacity of more or less food, such as cooking lines of 2,000 or 6,000 pounds per hour of food, a proportionally reduced or enlarged heat exchanger may be provided.

The embodiments disclosed herein include cooking systems (e.g., cooking system 10) that may continuously operate for relatively long periods of time between shutdowns for maintenance, repair, and/or cleaning. In addition, the embodiments disclosed herein include a number of features that, as previously described, are configured to simplify, and thus shorten, repair and maintenance operations so that the cooking system may be more efficiently and quickly brought back into operation. Thus, through use of the cooking system disclosed herein, an industrial food cooking operation may reduce lost production due to periods of non-operation.

Figure 26:
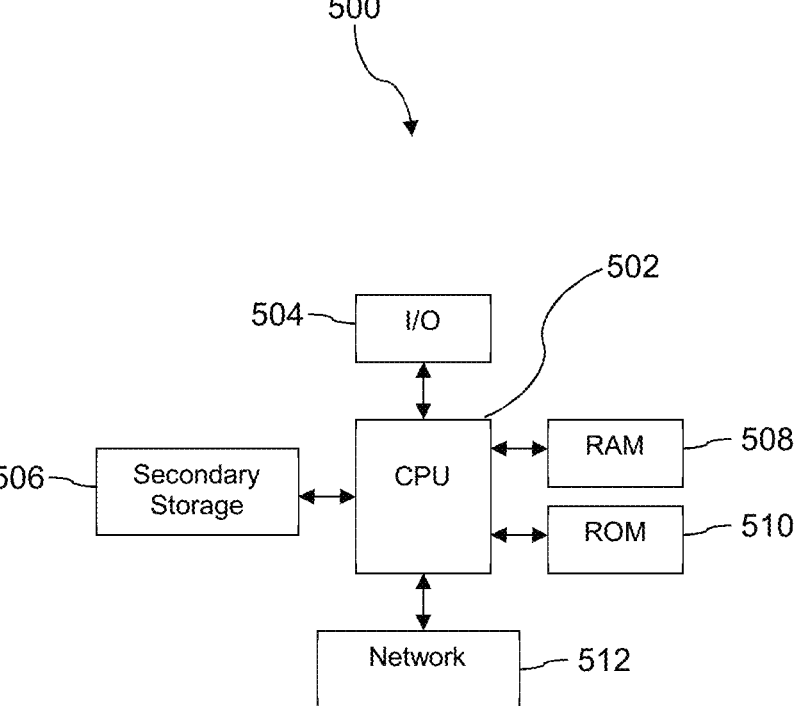
FIG. 26 is a diagram of one embodiment of a computer system capable of implementing the systems and methods described herein.

Referring to FIG. 26, various aspects of the cooking system 10 may be controlled by a computer program or tool on a computer system or accessible by computer system via a web interface. FIG. 26 illustrates such a computer system 500 suitable for implementing one or more embodiments disclosed herein. The computer system 500 includes a processor 502 (which may be referred to as a central processor unit or CPU) that is in communication with memory devices including secondary storage 506, read only memory (ROM) 510, random access memory (RAM) 508, input/output (I/O) devices 504, and network connectivity devices 512. The processor 502 may be implemented as one or more CPU chips.

It is understood that by programming and/or loading executable instructions onto the computer system 500, at least one of the CPU 502, the RAM 508, and the ROM 510 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 500 is turned on or booted, the CPU 502 may execute a computer program or application. For example, the CPU 502 may execute software or firmware stored in the ROM 510 or stored in the RAM 508. In some cases, on boot and/or when the application is initiated, the CPU 502 may copy the application or portions of the application from the secondary storage 506 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 504 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 506 is typically comprised of one or more disk drives or tape drives and is used for non-volatile storage of data and as an over-flow data storage device if RAM 508 is not large enough to hold all working data. Secondary storage 506 may be used to store programs which are loaded into RAM 508 when such programs are selected for execution. The ROM 510 is used to store instructions and perhaps data which are read during program execution. ROM 510 is a non-volatile memory device which typically has a small memory capacity relative to the larger memory capacity of secondary storage 506. The RAM 508 is used to store volatile data and perhaps to store instructions. Access to both ROM 510 and RAM 508 is typically faster than to secondary storage 506. The secondary storage 506, the RAM 508, and/or the ROM 510 may be referred to in some contexts as computer readable storage media and/or non-transitory computer readable media.

I/O devices 504 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID), and/or the like. The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk-based systems may all be considered secondary storage 506), flash drive, ROM 510, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 506, for example, hard drives, floppy disks, optical disks, and/or other device, the ROM 510, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 506, to the ROM 510, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 506, to the ROM 510, to the RAM 508, and/or to other non-volatile memory and volatile memory of the computer system 500.

In some contexts, the secondary storage 506, the ROM 510, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Computer system 500 may be in communication with numerous systems and sub-systems of the cooking system 10. For example, it will be appreciated that the various pipes, ductwork, and so on that provide, for example, fuel to burners and cooking oil to various portions of cooking systems 10 may include automated solenoids, valves, and so on that provide fuel for the burners and adjustment of the cooking oil moving through the cooking system 10, all of which may be automatically adjusted and controlled by the computer system 500. In a non-limiting example, computer system 500 may be in communication with sensor 315 and receive information from senor 315 that the computer system 500 uses to determine whether additional cooking oil needs to be added to the cooking system 10 and, when needed, actuate various valves or solenoids from cooking oil storage tanks in communication with the cooking system 10 to add additional cooking oil to the cooking system 10. Other examples include actuating valves or solenoids to add or reduce the fuel being provided to burners of the cooking system 10 to increase or decrease the resulting heat generated by such burners, for example, to increase the temperature in the thermal oxidizer or that of the cooking oil traversing through heat exchangers of the cooking system 10. These are merely some examples of the computer system 500 providing automation and operation of the cooking system 10 as anticipated by the present disclosure, and further examples will not be provided for sake of brevity, but which will readily suggest themselves to one skilled in the art based on the present teachings, all of which are within the spirit and scope of the present disclosure.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion above and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A heat exchanger for a cooking system, the heat exchanger comprising:
   a central axis;
   a combustion chamber, comprising:
   a central flow path;
   an inlet manifold;
   an outlet manifold axially spaced from the inlet manifold;
   wherein the inlet manifold and the outlet manifold extend annularly about the central flow path;
   a plurality of outer walls extending axially between the inlet manifold and the outlet manifold, wherein the plurality of outer walls are arranged about a radially outer perimeter of the central flow path; and
   a burner assembly including one or more burners that are configured to emit a combusted air/fuel mixture into the central flow path; and
   a heat exchanger assembly coupled to the combustion chamber, wherein the heat exchanger assembly comprises:

a central flow path fluidly coupled to the central flow path of the combustion chamber;

a plurality of first headers positioned about a radially outer perimeter of the central flow path of the heat exchanger assembly; and a plurality of first tubes extending radially across the central flow path of the heat exchanger assembly between the plurality of first headers, wherein the outlet manifold of the combustion chamber is fluidly coupled to the plurality of first headers of the heat exchanger assembly.

2. The heat exchanger of claim 1, wherein the heat exchanger assembly comprises:

an inlet module; and a heat exchanger module removably coupled to and adjacent the inlet module along the central axis, wherein the plurality of first headers and the plurality of first tubes are positioned within the heat exchanger module;

wherein the inlet module comprises:

a plurality of second headers positioned about an outer perimeter of the inlet module;

a plurality of second tubes extending radially across the central flow path of the heat exchanger assembly between the plurality of second headers; and a plurality of caps coupled to the plurality of second headers, wherein each cap is configured to be removed from a corresponding one of the plurality of second headers to expose one of the plurality of second tubes through the corresponding one of the plurality of second headers.

3. The heat exchanger of claim 2, wherein the plurality of second headers comprise a plurality of lower second headers and a plurality of upper second headers positioned axially above the lower second headers, and wherein each of the plurality of second tubes extends from a lower second header, across a fluid duct in a U-tube arrangement, and into an upper second header.

4. The heat exchanger of claim 3, wherein the central flow path of the combustion chamber and the central flow path of the heat exchanger assembly form the fluid duct that extends along the central axis, wherein the fluid duct is fluidly isolated from the plurality of first headers, the plurality of second headers, the plurality of first tubes, and the plurality of second tubes.

5. The heat exchanger of claim 4, wherein the inlet module comprises:

a rectangular cross-section having a first side, a second side radially opposite the first side, a third side, and a fourth side radially opposite the third side;

an inlet in parallel fluid communication with the plurality of lower second headers positioned along the first side and the fourth side; and an outlet in parallel fluid communication with the plurality of upper second headers positioned along the first side and the third side.

6. A heat exchanger, comprising:

a central axis; and a combustion chamber, comprising:

a central flow path;

an inlet manifold;

an outlet manifold axially spaced from the inlet manifold;

a plurality of walls extending axially between the inlet manifold and the outlet manifold, wherein the plurality of walls are arranged about a radially outer perimeter of the central flow path, wherein each of the plurality of walls include an inner wall spaced apart from an outer wall and an inner passageway defining a space between the inner and outer walls; and a burner assembly including one or more burners that are configured to emit a combusted air/fuel mixture into the central flow path, wherein the plurality of walls include a plurality of guides located in the inner passageway of each wall, wherein the guides are further defined as ribs extending between adjacent a lower end of the wall to adjacent an upper end of the wall, and wherein the ribs have a substantially flat first side and a second side, the second side including a plurality of notches, and wherein the outer wall includes a plurality of holes, the first side of the ribs mounted to the inner wall and the outer wall mounted to the ribs such that the notches in the ribs align and mate with the plurality of holes in the outer wall.

7. The heat exchanger of claim 6, wherein the inlet manifold is in fluid communication with each of the walls, and wherein the outlet manifold is mounted to an upper outer surface of at least one of the walls.

8. A heat exchanger, comprising:

a central flow path;

an inlet manifold;

an outlet manifold axially spaced from the inlet manifold;

a plurality of walls extending axially between the inlet manifold and the outlet manifold, wherein the plurality of walls are arranged about a radially outer perimeter of the central flow path, wherein each of the plurality of walls include an inner wall spaced apart from an outer wall and an inner passageway defining a space between the inner and outer walls; and a burner assembly including one or more burners that are configured to emit a combusted air/fuel mixture into the central flow path, and wherein the inlet manifold is in fluid communication with each of the walls, and wherein the outlet manifold includes at least two inlets, both inlets mounted to an upper outer surface of one of the walls.

9. The heat exchanger of claim 8, wherein the inlet manifold is in fluid communication with each of the walls, wherein the outlet manifold includes one or more manifolds, and wherein a first manifold is mounted to an upper outer surface of a first wall and a second manifold is mounted to an upper outer surface of a second wall.

10. A heat exchanger, comprising:

a central flow path;

an inlet manifold;

an outlet manifold axially spaced from the inlet manifold;

a plurality of walls extending axially between the inlet manifold and the outlet manifold, wherein the plurality of walls are arranged about a radially outer perimeter of the central flow path, wherein each of the plurality of walls include an inner wall spaced apart from an outer wall and an inner passageway defining a space between the inner and outer walls; and a burner assembly including one or more burners that are configured to emit a combusted air/fuel mixture into the central flow path, wherein the inlet manifold is in fluid communication with each of the walls, and wherein the outlet manifold includes at least two inlets, both inlets mounted to an upper outer surface of one of the walls, and wherein the burner assembly comprises a plurality of burner assemblies.

11. The heat exchanger of claim 10, wherein the plurality of burner assemblies is further defined as four burner assemblies, and wherein the four burner assemblies are disposed such that a first burner assembly is positioned between a first wall and a second wall, a second burner assembly is positioned between the second wall and a third wall, a third burner assembly is positioned between the third wall and a fourth wall, and a fourth burner assembly is positioned between the fourth wall and the first wall.

12. A cooking system, comprising:
a cooking vessel configured to receive a cooking fluid and a food item to perform a cooking reaction, and
a heat exchanger coupled to the cooking vessel that is configured to provide the cooking fluid to the cooking vessel, wherein the heat exchanger comprises:
a combustion chamber:
a central axis;
an inlet manifold;
an outlet manifold axially spaced from the inlet manifold;
a plurality of walls extending axially between the inlet manifold and the outlet manifold, each of the plurality of walls including an inner wall spaced apart from an outer wall and an inner passageway defining a space between the inner and outer walls; and
a burner assembly;
a heat exchanger assembly coupled to the combustion chamber, wherein the heat exchanger assembly comprises:
a plurality of first headers positioned about a radially outer perimeter of the heat exchanger assembly; and
a plurality of first tubes extending between the plurality of first headers,
wherein the heat exchanger is configured to flow cooking fluid through the inlet manifold, through the inner passageway of the plurality of walls of the combustion chamber, the outlet manifold, the plurality of first headers, and the plurality of first tubes of the heat exchanger assembly; and
a fluid duct extending axially through the combustion chamber and the heat exchanger assembly, wherein the plurality of walls of the combustion chamber are arranged about an outer perimeter of the fluid duct, wherein the burner assembly is configured to emit combusted air/fuel mixture into the fluid duct, and wherein the plurality of first tubes of the heat exchanger assembly extend radially across the fluid duct.

13. The cooking system of claim 12, wherein the heat exchanger assembly comprises:
an inlet module; and
a heat exchanger module removably coupled to and adjacent the inlet module along the central axis, wherein the plurality of first headers and the plurality of first tubes are positioned within the heat exchanger module;
wherein the inlet module comprises:
a plurality of second headers positioned about an outer perimeter of the inlet module;
a plurality of second tubes extending radially across the fluid duct between the plurality of second headers; and
a plurality of caps coupled to the plurality of second headers, wherein each cap is configured to be removed from a corresponding one of the plurality of second headers to expose one of the plurality of second tubes through the corresponding one of the plurality of second headers.

14. The cooking system of claim 13, wherein the plurality of second headers comprise a plurality of lower second headers and a plurality of upper second headers positioned axially above the plurality of lower second headers, and wherein each of the plurality of second tubes extends from a lower second header, across the fluid duct in a U-tube arrangement, and into an upper second header.

15. The cooking system of claim 14, wherein a central flow path of the combustion chamber and a central flow path of the heat exchanger assembly form the fluid duct that extends along the central axis.

16. The cooking system of claim 15, wherein the inlet module comprises:
a rectangular cross-section having a first side, a second side radially opposite the first side, a third side, and a fourth side radially opposite the third side;
an inlet in parallel fluid communication with the plurality of lower second headers positioned along the first side and the fourth side; and
an outlet in parallel fluid communication with the plurality of upper second headers positioned along the first side and the third side.

\* \* \* \* \*